US 8,555,189 B2

(12) United States Patent
Ata et al.

(10) Patent No.: US 8,555,189 B2
(45) Date of Patent: Oct. 8, 2013

(54) MANAGEMENT SYSTEM AND MANAGEMENT SYSTEM CONTROL METHOD

(75) Inventors: Emiko Ata, Yamato (JP); Takaki Kuroda, Machida (JP)

(73) Assignee: Hitachi, Ltd., Tokyo (JP)

( * ) Notice: Subject to any disclaimer, the term of this patent is extended or adjusted under 35 U.S.C. 154(b) by 543 days.

(21) Appl. No.: 12/742,897

(22) PCT Filed: Feb. 16, 2010

(86) PCT No.: PCT/JP2010/000960
§ 371 (c)(1),
(2), (4) Date: May 13, 2010

(87) PCT Pub. No.: WO2011/101887
PCT Pub. Date: Aug. 25, 2011

(65) Prior Publication Data
US 2012/0005609 A1    Jan. 5, 2012

(51) Int. Cl.
*G06F 3/048* (2013.01)

(52) U.S. Cl.
USPC .......................... 715/771; 709/224; 709/318

(58) Field of Classification Search
None
See application file for complete search history.

(56) References Cited

U.S. PATENT DOCUMENTS

| 7,467,263 | B2 | 12/2008 | Ozaki et al. | |
|---|---|---|---|---|
| 2002/0083169 | A1* | 6/2002 | Aki et al. | 709/224 |
| 2002/0169870 | A1* | 11/2002 | Vosseler et al. | 709/224 |
| 2006/0041928 | A1 | 2/2006 | Masuoka | |
| 2007/0070975 | A1 | 3/2007 | Otani et al. | |
| 2008/0208373 | A1 | 8/2008 | Thurau | |
| 2009/0249213 | A1 | 10/2009 | Murase et al. | |
| 2009/0271667 | A1 | 10/2009 | Onitsuka et al. | |

FOREIGN PATENT DOCUMENTS

| JP | 08-123711 | | 5/1996 |
|---|---|---|---|
| JP | 2006-058938 | | 3/2006 |
| JP | 2007-087266 | A | 4/2007 |
| JP | 2007-328396 | A | 12/2007 |
| JP | 2009-187230 | | 8/2009 |
| JP | 2009-265785 | | 11/2009 |
| JP | 2010-009411 | | 1/2010 |

OTHER PUBLICATIONS

U.S. Appl. No. 12/365,297, filed Feb. 4, 2009, Soeda et al.
PCT International Search Report and Written Opinion on application No. PCT/JP2010/000960 dated May 25, 2010; 7 pages (with partial English-language translation of Written Opinion, 2 pages).

* cited by examiner

*Primary Examiner* — Boris Pesin
*Assistant Examiner* — Ayesha Huertas Torres
(74) *Attorney, Agent, or Firm* — Foley & Lardner LLP

(57) ABSTRACT

The present invention makes it possible to set a monitoring method for each of a plurality of monitoring-targeted objects. A node, such as a server, and a component, which is included in the node, are monitoring-targeted objects. An information acquiring part 140 acquires information from the monitoring-targeted objects. A control part 130 monitors the status of each of the monitoring-targeted objects based on the monitoring method set by a user for each of the monitoring-targeted objects, and outputs an alert in a case where a failure has been detected. A monitoring status is linked between monitoring-targeted objects that are associated to one another.

15 Claims, 40 Drawing Sheets

FIG. 8

NODE TABLE /151

| NODE ID 1510 | NODE NAME 1511 | TYPE 1512 | STATUS 1513 | MONITORING STATUS 1514 | COMMON SETTING 1515 | VIRTUAL SERVER HOST ID 1516 | ... |
|---|---|---|---|---|---|---|---|
| 001 | HOST OS | SERVER | NORMAL | MONITORING | APPLIED | — | ... |
| 002 | GUEST OS1 | SERVER | NORMAL | MONITORING | APPLIED | 001 | ... |
| 003 | GUEST OS2 | SERVER | NORMAL | MONITORING | APPLIED | 001 | ... |
| 004 | GUEST OS3 | SERVER | ... | ... | APPLIED | 001 | ... |
| ... | ... | ... | ... | ... | ... | ... | ... |

FIG. 9

COMPONENT TABLE ~152

| COMPONENT ID 1520 | COMPONENT NAME 1521 | TYPE 1522 | NODE ID 1523 | STATUS 1524 | MONITORING STATUS 1525 | COMMON SETTING 1526 | ... |
|---|---|---|---|---|---|---|---|
| 001 | CPU1 | CPU | 001 | NORMAL | MONITORING | APPLIED | ... |
| 002 | VM1 | VM | 001 | NORMAL | MONITORING | APPLIED | ... |
| 003 | VM2 | VM | 001 | NORMAL | MONITORING | APPLIED | ... |
| 004 | VM3 | VM | 001 | NORMAL | MONITORING | APPLIED | ... |
| ... | ... | ... | ... | ... | ... | ... | ... |

FIG. 10

METRICS COMMON SETTING TABLE — 153

| METRICS TYPE 1530 | GRAPH DISPLAY 1531 | EVENT NOTIFICATION 1532 | ALERT THRESHOLD 1533 | ABNORMALITY THRESHOLD 1534 | ... |
|---|---|---|---|---|---|
| TYPE 1 | true | true | >80% | >90% | ... |
| TYPE 2 | true | false | — | — | ... |
| TYPE 3 | false | false | — | — | ... |
| ... | ... | ... | ... | ... | ... |

FIG. 11

PERFORMANCE INFORMATION TABLE /154

| COMPONENT ID 1540 | METRICS ID 1541 | METRICS TYPE 1542 | STATUS 1543 | GRAPH DISPLAY 1544 | EVENT NOTIFICATION 1545 |
|---|---|---|---|---|---|
| 001 | 001 | TYPE 1 | ABNORMAL | true | true |
| 001 | 002 | TYPE 2 | ABNORMAL | true | false |
| 001 | 003 | TYPE 3 | ABNORMAL | false | false |
| 004 | 004 | TYPE 1 | NORMAL | true | true |
| 004 | 005 | TYPE 2 | NORMAL | true | false |
| ... | ... | ... | ... | ... | ... |

FIG. 12

| | | | |
|---|---|---|---|
| SWITCH PORT TABLE | | | ~155 |
| PORT ID (1550) | COMPONENT ID (1551) | MAC ADDRESS (1552) | ... |
| 001 | 011 | MAC ADDRESS1A | ... |
| 002 | 012 | MAC ADDRESS2A | ... |
| ... | ... | ... | ... |

FIG. 13

LAN PORT TABLE ~156

| PORT ID 1560 | COMPONENT ID 1561 | MAC ADDRESS 1562 | MAC ADDRESS AT DESTINATION SWITCH PORT 1563 |
|---|---|---|---|
| 001 | 101 | MAC ADDRESS1B | MAC ADDRESS 1A |
| 002 | 102 | MAC ADDRESS2B | MAC ADDRESS 2A |
| ... | ... | ... | ... |

FIG. 17

| | | T10 |
|---|---|---|
| EXPLANATION OF METRICS MONITORING CONTROL | | |
| C100 | C101 | C102 |
| ACQUIRE PERFORMANCE INFORMATION | DETERMINE METRICS STATUS | NOTIFICATION TO USER |
| YES | YES | DISPLAY GRAPH. NOTIFY OF EVENT. |
| | NO | DISPLAY GRAPH. DO NOT NOTIFY OF EVENT. |
| NO | NO | DO NOT DISPLAY GRAPH. DO NOT NOTIFY OF EVENT. |

FIG. 18

METRICS COMMON SETTING SCREEN — G20

| GRAPH DISPLAY (GP20) | EVENT NOTIFICATION (GP21) | METRICS TYPE (GP22) | ALERT THRESHOLD (GP23) | ABNORMALITY THRESHOLD (GP24) |
|---|---|---|---|---|
| ☑ | ☑ | TYPE 1 | >80% | >90% |
| ☑ | ☐ | TYPE 2 | <1000MB | <500MB |
| ☐ | ☐ | TYPE 3 | >90MB/sec | >100MB/sec |

OK    Cancel

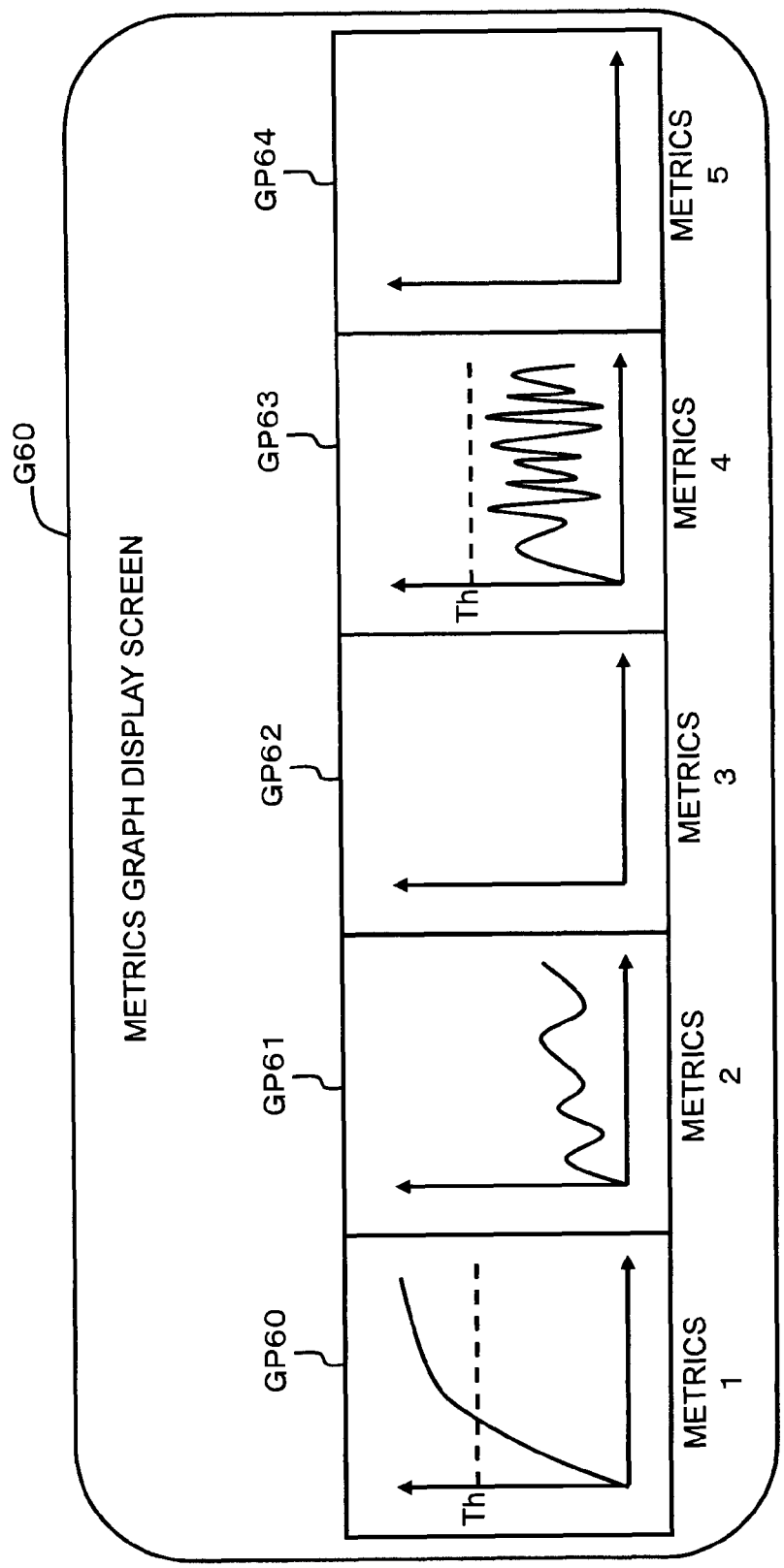

FIG. 25

| METRICS MONITORING CONTROL \ COMPONENT MONITORING CONTROL | MONITORING (MAINTENANCE) | NON-MONITORING |
|---|---|---|
| DISPLAY GRAPH / NOTIFY OF EVENT | DISPLAY GRAPH. NOTIFY OF EVENT. | DISPLAY GRAPH. DO NOT NOTIFY OF EVENT. |
| DISPLAY GRAPH / DO NOT NOTIFY OF EVENT | DISPLAY GRAPH. DO NOT NOTIFY OF EVENT. | DISPLAY GRAPH. DO NOT NOTIFY OF EVENT. |
| DO NOT DISPLAY GRAPH / DO NOT NOTIFY OF EVENT | DO NOT DISPLAY GRAPH. DO NOT NOTIFY OF EVENT. | DO NOT DISPLAY GRAPH. DO NOT NOTIFY OF EVENT. |

NODE TABLE

| NODE ID (1510) | NODE NAME (1511) | TYPE (1512) | MONITORING STATUS (1514) |
|---|---|---|---|
| 011 | SWITCH 1 | SWITCH | NON-MONITORING |
| 012 | SERVER 1 | SERVER | MONITORING |
| 013 | STORAGE 1 | STORAGE | MONITORING |

152

COMPONENT TABLE

| COMPONENT ID (1520) | COMPONENT NAME (1521) | TYPE (1522) | NODE ID (1523) | MONITORING STATUS (1525) |
|---|---|---|---|---|
| 011 | PORT 1 | SWITCH PORT | 011 | NON-MONITORING |
| 012 | PORT 2 | SWITCH PORT | 011 | NON-MONITORING |

MANAGEMENT SYSTEM AND MANAGEMENT SYSTEM CONTROL METHOD

TECHNICAL FIELD

This invention relates to a management system and a management system control method.

BACKGROUND ART

A system, in which an operation monitoring server monitors the operational status of a video distribution server at fixed intervals and issues an alert in a case where the occurrence of a failure is detected, is known (Patent Literature 1). In addition, technology, in which a management server monitors the communication ports inside a system and selects an alternative communication port in a case where a failure has occurred in a certain communication port, is known (Patent Literature 2).

CITATION LIST

Patent Literature

[PTL 1]
Japanese Patent Application Laid-Open No. 2009-187230
[PTL 2]
Japanese Patent Application Laid-Open No. 2007-087266

SUMMARY OF INVENTION

Technical Problem

In the prior art, each node inside the system is monitored individually and the monitoring status of the nodes is not interlinked. For example, even in a case where one node and another node are associated with each other, the monitoring status of the one node is not linked to the monitoring status of the other node. Therefore, in a case where the monitoring status of the one node changes, the user must manually change the monitoring status of the other node. For this reason, the prior art is not user-friendly.

In addition, in the prior art, the nodes are uniformly monitored without variation, and individually setting the monitoring methods is difficult. Therefore, for example, a link-down alert may be outputted even in a case where the cable has been disconnected from the device for maintenance work. In the prior art, user convenience is low because even an event that the user is clearly aware of is detected as a failure. In addition, for example, in a case where the user is aware of a large number of failures resulting from a relatively wide-range of maintenance work, there is the likelihood that the user will be late in identifying a real failure buried thereamong.

Accordingly, an object of the present invention is to provide a management system and a management system control method that is capable of enhancing the usability of the user. Another object of the present invention is to provide a management system and a management system control method, which make it possible to set a monitoring method for each monitoring-targeted object, and, in addition, which make it possible to link a monitoring method between associated monitoring-targeted objects. Yet other objects of the present invention should become clear from the description of the embodiment.

Solution to Problem

A management system according to a first aspect of the present invention for solving the above-mentioned problems is a management system for monitoring the status of a computer system, and the computer system comprises a plurality of monitoring-targeted objects that become monitoring targets. The management system comprises: a microprocessor; a memory for storing a program to be read out and executed by the microprocessor; a communication interface for the microprocessor to communicate with each monitoring-targeted object; and a user interface for the microprocessor to exchange information with a user. The microprocessor, by reading in and executing the program, respectively establishes a monitoring method setting part for setting a monitoring method for each monitoring-targeted object, an information acquiring part for acquiring information from the monitoring-targeted objects by way of the communication interface, a monitoring part for monitoring the monitoring-targeted objects on the basis of the monitoring methods and the information acquired from the monitoring-targeted objects, and outputting these monitoring results via the user interface, and a monitoring method changing part for, in a case where the monitoring method that has been set for a first monitoring-targeted object included among the monitoring-targeted objects is changed, changing the monitoring method that has been set for a second monitoring-targeted object, which is included among the monitoring-targeted objects and which is related to the first monitoring-targeted object, by following suit the change of the monitoring method set for the first monitoring-targeted object.

In a second aspect according to the first aspect, the monitoring method comprises a notification setting for determining whether or not to output a prescribed notification based on the information acquired from the monitoring-targeted object, and, in a case where the notification setting for the first monitoring-targeted object has been changed, the monitoring method changing part causes the notification setting for the second monitoring-targeted object to be identical to the notification setting for the first monitoring-targeted object.

In a third aspect according to the second aspect, the monitoring method changing part retrieves, as a candidate for a second monitoring-targeted object, a monitoring-targeted object that is associated with the first monitoring-targeted object from among the monitoring-targeted objects, and makes the monitoring-targeted object that is selected by the user from among retrieved candidates the second monitoring-targeted object.

In a fourth aspect according to the third aspect, the monitoring method changing part either retrieves a monitoring-targeted object that is directly associated with the first monitoring-targeted object from among the monitoring-targeted objects as a candidate, or retrieves both a monitoring-targeted object that is directly associated with the first monitoring-targeted object and a monitoring-targeted object that is directly associated with a monitoring-targeted object concerned from among the monitoring-targeted objects as a candidate.

In a fifth aspect according to the second aspect, the plurality of monitoring-targeted objects comprise a host machine, and a virtual machine created by a virtualization mechanism that operates on the host machine, the first monitoring-targeted object is the host machine, the second monitoring-targeted object is the virtual machine, and the monitoring method changing part, in a case where the first notification setting for the host machine has been changed to a setting that does not output the prescribed notification, changes the second notification setting for the virtual machine to a setting that does not output the prescribed notification.

In a sixth aspect according to the second aspect, the plurality of monitoring-targeted objects comprise a host machine, and a virtualization mechanism, which operates on the host machine and creates a virtual machine, the first monitoring-targeted object is the virtual machine, the second monitoring-targeted object is the virtualization mechanism, and the monitoring method changing part, in a case where the first notification setting for the virtual machine has been changed to a setting that does not output the prescribed notification, changes the second notification setting for the virtualization mechanism to a setting that does not output the prescribed notification.

In a seventh aspect according to the second aspect, the plurality of monitoring-targeted objects comprise a switching device that has a communication port, the first monitoring-targeted object is the switching device, the second monitoring-targeted object is the communication port, and the monitoring method changing part, in a case where the first notification setting for the switching device has been changed to a setting that does not output the prescribed notification, changes the second notification setting for the communication port to a setting that does not output the prescribed notification.

In an eighth aspect according to the second aspect, the plurality of monitoring-targeted objects comprise a switching device that has a communication port and another device that has another communication port, which is coupled to the communication port, the first monitoring-targeted object is the communication port, the second monitoring-targeted object is the other communication port, and the monitoring method changing part, in a case where the first notification setting for the communication port has been changed to a setting that does not output the prescribed notification, changes the second notification setting for the other communication port to a setting that does not output the prescribed notification.

In a ninth aspect according to the second aspect, the monitoring method comprises a first mode, which monitors a status of the monitoring-targeted object through information acquired by the information acquiring part and which outputs the prescribed notification in a case where a failure has been detected, a second mode, which does not monitor the status of the monitoring-targeted object, and a third mode, which determines that the current status of the monitoring-targeted object is normal regardless of whether this status is normal or not.

In a tenth aspect according to the ninth aspect, the third mode transitions to the first mode in a case where the status of the monitoring-targeted object has been changed.

In an eleventh aspect according to the second aspect, the plurality of monitoring-targeted objects comprise a plurality of node devices and component devices that configure a portion of each of the node devices, and the monitoring method allows setting for each component device as to whether or not to acquire, through the information acquiring part, information related to a status of a prescribed attribute of a plurality of attributes of the component devices, and whether or not to determine the status of the prescribed attribute by comparing the information related to the status of the prescribed attribute to a prescribed threshold.

A management system control method according to a twelfth aspect is a method for controlling a management system that monitors a monitoring-targeted object, which is a monitoring target, with a computer system being configured to include a plurality of monitoring-targeted objects, the method comprising: setting a monitoring method for each monitoring-targeted object; acquiring information from the monitoring-targeted objects; monitoring the monitoring-targeted objects based on the monitoring methods and the information acquired from the monitoring-targeted objects; outputting the monitoring result via the user interface; determining whether or not the monitoring method set for a first monitoring-targeted object included in the monitoring-targeted objects has been changed; and detecting, in a case where the monitoring method of the first monitoring-targeted object has been changed, a second monitoring-targeted object associated with the first monitoring-targeted object from among the monitoring-targeted objects; and causing the monitoring method set for the second monitoring-targeted object to be identical to the monitoring method of the first monitoring-targeted object.

A management system control method according to a thirteenth aspect is a method for controlling a management system that monitors a status of a computer system, with a computer system being configured to include a plurality of monitoring-targeted objects, which are monitoring targets, and a monitoring method for monitoring the monitoring-targeted objects including a first mode, which outputs a prescribed notification in a case where a failure has been detected in a monitoring-targeted object, a second mode, which does not monitor the status of the monitoring-targeted objects, and a third mode, which determines that the current state of the monitoring-targeted object is normal regardless of whether this status is normal or not, the method comprising: setting any one mode from among the plurality of modes of the monitoring method for each monitoring-targeted object; acquiring information from the monitoring-targeted objects; monitoring the monitoring-targeted objects; and outputting the monitoring results based on the set mode and the information acquired from the monitoring-targeted objects.

In a fourteenth aspect according to the thirteenth aspect, the third mode transitions to the first mode in a case where the status of the monitoring-targeted object has changed.

In a fifteenth aspect according to the fourteenth aspect, the plurality of monitoring-targeted objects comprise a plurality of node devices and component devices that configure a portion of each of the node devices, and the monitoring method allows setting for each component device as to whether or not to acquire information related to a status of a prescribed attribute of a plurality of attributes of the component devices, and whether or not to determine the status of the prescribed attribute by comparing the information related to the status of the prescribed attribute with a prescribed threshold.

Other combinations in addition to the combinations of the above-mentioned aspects are also included within the scope of the present invention. In addition, either all or a portion of the present invention may be configured as a computer system, and the present invention may also be distributed via either a recording medium or a communication medium.

BRIEF DESCRIPTION OF DRAWINGS

FIG. 8 is an example of the configuration of a node table.

FIG. 9 is an example of the configuration of a component table.

FIG. 10 is an example of the configuration of a metrics common setting table.

FIG. 11 is an example of the configuration of a performance information table.

FIG. 12 is an example of the configuration of a switch port table.

FIG. 13 is an example of the configuration of a LAN port table.

FIG. 17 is a schematic diagram showing combinations of control methods for monitoring metrics.

FIG. 18 shows an example of a screen for monitoring metrics using a common setting.

FIG. 24 is an example of a screen for displaying metrics in a graph.

FIG. 25 is a diagram illustrating combination patterns for component monitoring control and metrics monitoring control.

FIG. 38 is a diagram showing how the component table changes in accordance with a change in the node table.

DESCRIPTION OF EMBODIMENTS

The embodiment of the present invention will be explained below based on the drawings. The present invention, as will be explained below, sets a monitoring method for each of the monitoring-targeted objects (nodes and components). In addition, in the present invention, in a case where the monitoring method of one monitoring-targeted object of monitoring-targeted objects that are associated with one another has changed, the monitoring method of the other monitoring-targeted object also changes in conjunction therewith. In addition, in the present invention, a special mode is provided for preventing unnecessary alerts from being outputted during maintenance work. In the examples that will be explained below, a monitoring-targeted object may be called an "IT resource".

Figure 1:
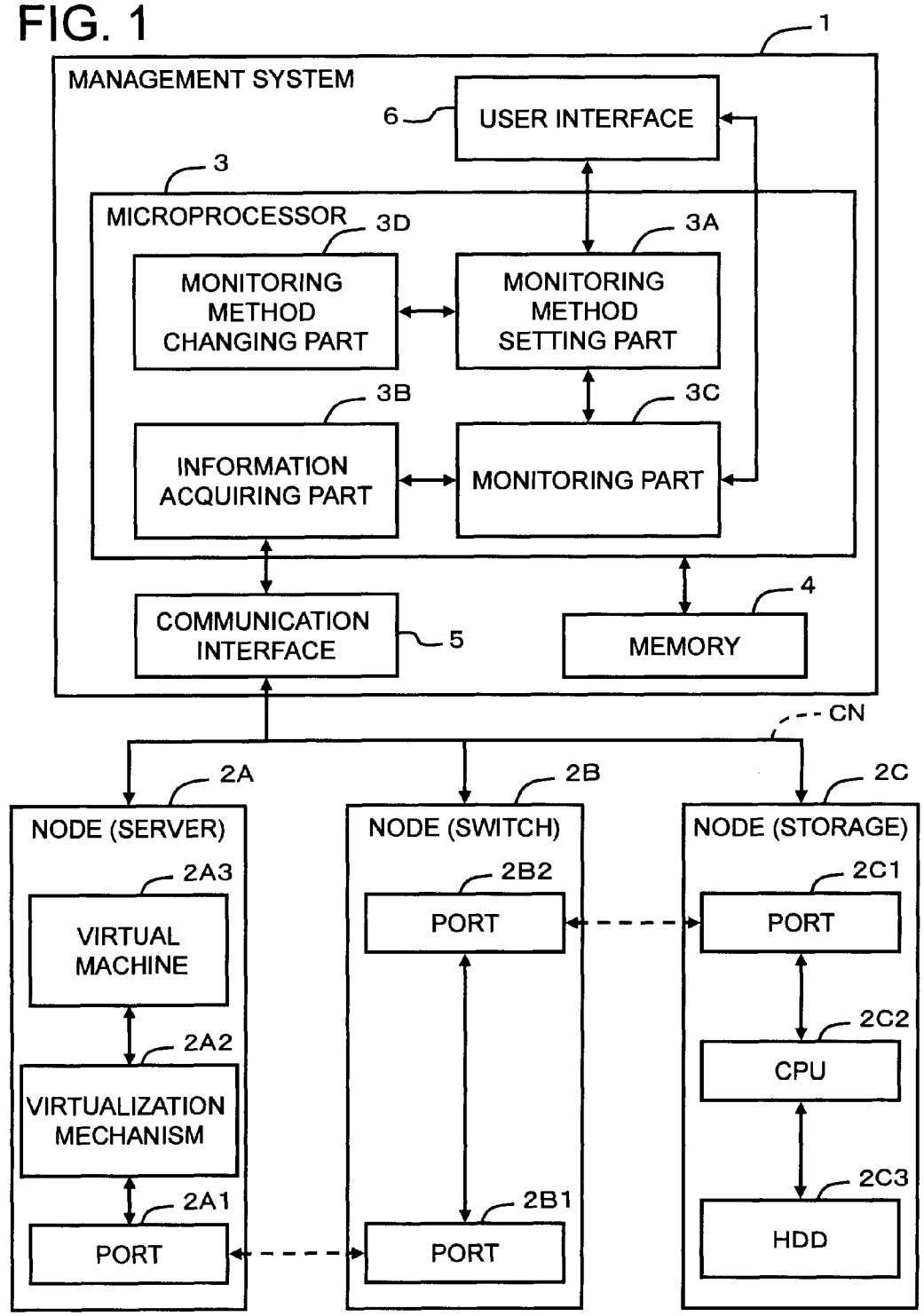
FIG. 1 is a diagram showing an overview of the embodiment.

FIG. 1 is a schematic diagram showing an overview of the embodiment in its entirety. In FIG. 1, the present invention is described to the extent necessary to understand and to put same into practice. The scope of the present invention is not limited to the configuration described in FIG. 1. Characteristic features not described in FIG. 1 will be made clear in the examples described hereinbelow.

A management system 1 monitors the status of monitoring-targeted objects 2A, 2B, 2C that are included in a computer system, and outputs an alert when necessary. Before explaining the management system 1, first the nodes and components that are the monitoring-targeted objects will be explained.

The monitoring-targeted objects comprise a node, and either one or a plurality of components that configure the node. The node is an element that configures a communication network, and, for example, may include a server 2A, a switch 2B and a storage 2C. In a case where it is not particularly necessary to make a distinction, these nodes will be referred to overall as the "node 2".

The server 2A, for example, comprises a communication port 2A1, a virtualization mechanism 2A2, and a virtual machine 2A3. The communication port 2A1 is the component for communicating with another node, such as the switch 2B. The virtualization mechanism 2A2 is the component for constructing the virtual machine 2A3 on the OS (Operating System) of the server 2A. The virtual machine 2A3 is a server that is virtually disposed in the server 2A. The virtual machine 2A3 is treated as a separate node from the server 2A. As will be shown in the examples described hereinbelow, the server 2A, for example, may also comprise other components, such as a microprocessor, a memory and a file system.

The switch 2B comprises a plurality of switch ports 2B1, 2B2. The switch ports 2B1, 2B2 are the components for communicating with another node inside the computer system. The switch 2B, for example, may also comprise other components, such as a microprocessor and a memory.

The storage 2C, for example, comprises a communication port 2C1, a microprocessor 2C2, and a hard disk drive 2C3. The communication port 2C1 is the component for communication with another node, such as the switch 2B. The microprocessor 2C2 is the component that controls the operation of the storage 2C. The hard disk drive 2C3 is the component for storing data.

The configuration of the management system 1 will be explained. The management system 1, for example, comprises a microprocessor 3, a memory 4, a communication interface 5, and a user interface 6. The management system 1 may be configured from a single computer, or it may also be configured by making a plurality of computers work in unison.

The communication interface 5 is a device for communication via a communication network CN with the nodes 2A through 2C.

The user interface 6 is a device for exchanging information with a user. The user interface 6 comprises an information output device for providing information to the user, and an information input device for the user to input information. The information output device can be a display device, a printer, or the like. The information input device can be a keyboard, a pointing device, a touch panel, a microphone, or the like.

The microprocessor 3 realizes prescribed functions 3A, 3B, 3C, 3D by reading in and executing various computer programs stored in the memory 4. A monitoring method setting part 3A is a function for individually setting a monitoring method for each node and component.

The monitoring method, for example, comprises three modes. A first mode is for monitoring the status of either the nodes or the components. The first mode may be called the monitoring mode. In the first mode, in a case where either a failure is detected or performance information exceeds a threshold, an alert is outputted as a "prescribed notification". A second mode is for not monitoring the status of the nodes or the components. The second mode may be called the non-monitoring mode.

A third mode is for determining that the current status of either the node or the component, which is the monitoring target, is normal regardless of whether it is normal or not. As will be explained below, since the third mode is suitable for use during maintenance work, it may be called the maintenance mode. The third mode transitions to the first mode in a case where the status of either the node or the component changes further. When the third mode has transitioned to the first mode, an alert is outputted in a case where an abnormality has occurred in either the node or the component for which the status has changed.

An information acquiring part 3B is a function for collecting information from the nodes and the components. The collected information may be stored either in the memory 4 or inside a not-shown hard drive.

A monitoring part 3C is a function for respectively monitoring the nodes and the components on the basis of the monitoring method set by the monitoring method setting part 3A and the information collected by the information acquiring part 3B. In addition, the monitoring part 3C outputs the monitoring results via the user interface 6.

A monitoring method changing part 3D is a function for linking the monitoring status of either nodes or components, which are associated with one another, from among either the nodes or the components. In a case where one of the nodes is associated with the other one of the nodes, when the monitoring method of the one node changes, the monitoring method of the other one node also changes together therewith. The monitoring method of the other one node is changed so as to identical to the monitoring method of the one node.

For example, in a case where the monitoring method of the one node has been switched from the first mode to the second mode, the monitoring method of the other one node is also switched to the second mode. That is, the monitoring method changing part 3D changes the other monitoring method by following suit applying the one monitoring method of either the associated nodes or components. As will be explained below, the monitoring method changing part 3D does not simply link the monitoring status of the nodes, but rather is also able to respectively link the monitoring status of a node and a component, as well as between the components themselves.

In this embodiment, the user individually sets the monitoring method for each node and each component. The monitoring part 3C determines whether or not either a failure or a performance drop has occurred based on information from either the nodes or the components. The monitoring part 3C notifies the user via the user interface 6 whenever the occurrence of a failure has been detected.

The user, for example, may remove either a portion of the nodes or a portion of the components from the system to carry out maintenance work. At the time of this maintenance work, the user changes the monitoring status of either the node or component that is targeted for removal to either the second mode (non-monitoring mode) or the third mode (maintenance mode) beforehand.

The monitoring method changing part 3D extracts from inside the computer system the other node or the other component that is associated with either the node or the component for which the monitoring status has changed. The extracted node or component is presented to the user via the user interface 6. The user selects the node or the component for which the monitoring status is to be changed from among the nodes or components that have been presented. Either the monitoring status of the node or the monitoring status of the component selected by the user is changed in accordance with either the monitoring status of the node or the monitoring status of the component for which the monitoring status initially changed due to the maintenance work.

Since configuring this embodiment like this makes it possible to set the monitoring method for each of the nodes or each of the components, user convenience is enhanced. For example, it is possible to set a node that is not scheduled to be used to a mode that does not perform monitoring, and to set the monitoring method to a mode that does not perform monitoring for a portion of the components of the plurality of components of the node. Therefore, it is possible to prevent the output of an unnecessary alert, thereby making it possible to prevent the occurrence of a real failure from being buried among unnecessary alerts.

In this embodiment, it is possible to link the monitoring status of either associated nodes or associated components. Therefore, the user does not have to manually change the monitoring status of associated nodes or components, thereby enhancing user convenience.

This embodiment provides three modes in the monitoring method: the first mode, which monitors the node or the component; the second mode, which does not monitor the node or the component; and the third mode, which determines that the status is normal regardless of the current status of the node or the component (or determines that there is no abnormality). Therefore, the user is able to set the appropriate mode for each node and each component, thereby enhancing user convenience.

In addition, because the third mode transitions to the first mode in a case where the status of either the node or the component has changed further, the third mode is suitable for use at the time of maintenance work. For example, prior to the start of maintenance work, the user sets the monitoring status of either the node or the component that is the target of the maintenance work to the third mode. When the maintenance work has ended, the user does not have to manually change the monitoring status of either the node or component, which was set to the third mode, to the first mode. The user may leave the monitoring status of either the node or the component that was the target of the maintenance work as-is in the third mode. In a case where the status of either the node or the component that was the target of the maintenance work changes and an abnormality occurs, the monitoring status is automatically switched from the third mode to the first mode, and an alert is outputted. Therefore, the usability of the user is enhanced. This embodiment will be explained in detail below.

Example 1

Figure 2:
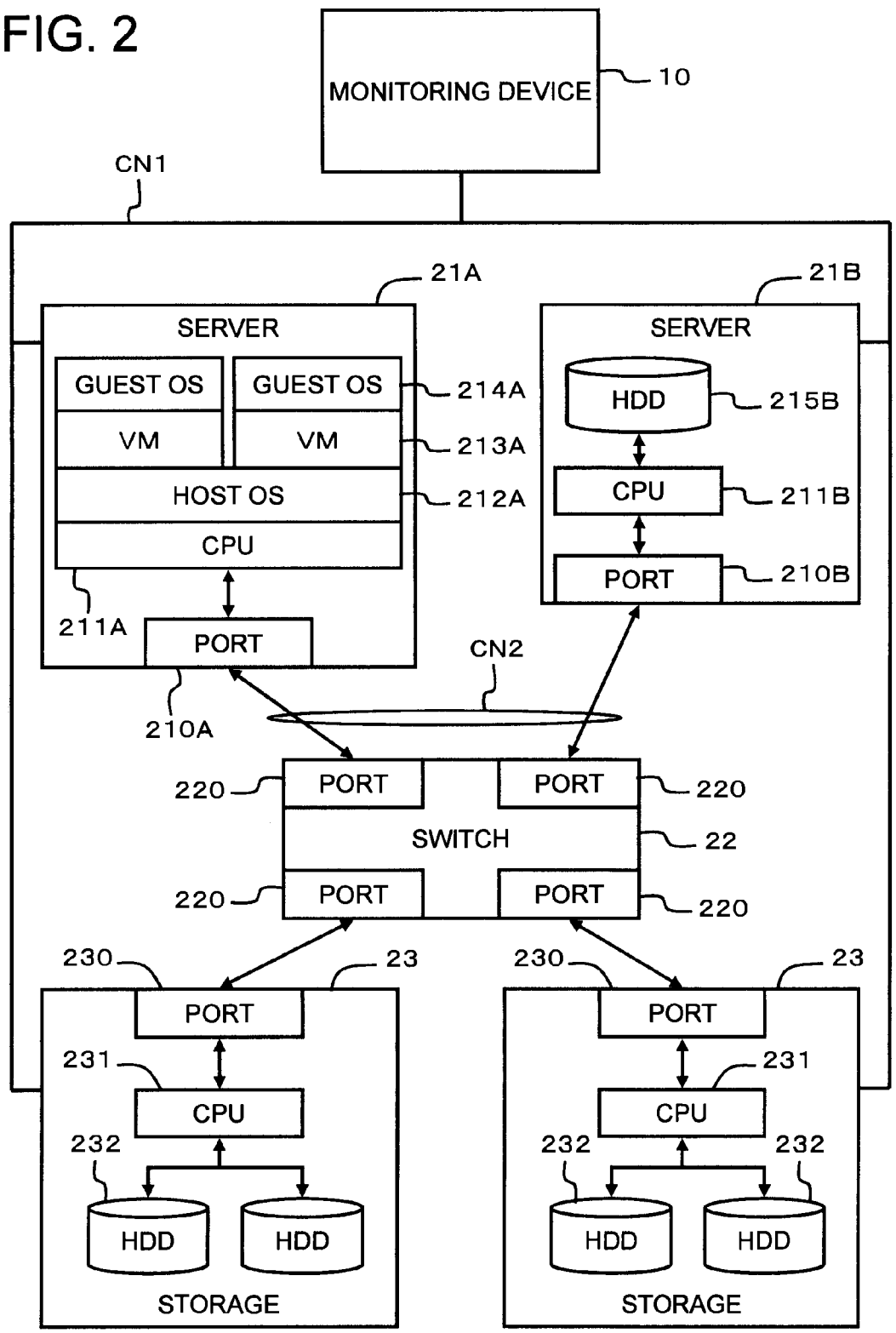
FIG. 2 is a diagram showing an overall configuration comprising a management system.

FIG. 2 shows an overview of the system of this example in its entirety. The corresponding relationships with FIG. 1 will be explained first. The monitoring apparatus 10 corresponds to the management system 1, the servers 21A and 21B correspond to the node 2A, the switch 22 corresponds to the node 2B, the storage 23 corresponds to the node 2C, and the communication network CN1 corresponds to the communication network CN, respectively.

Figure 3:
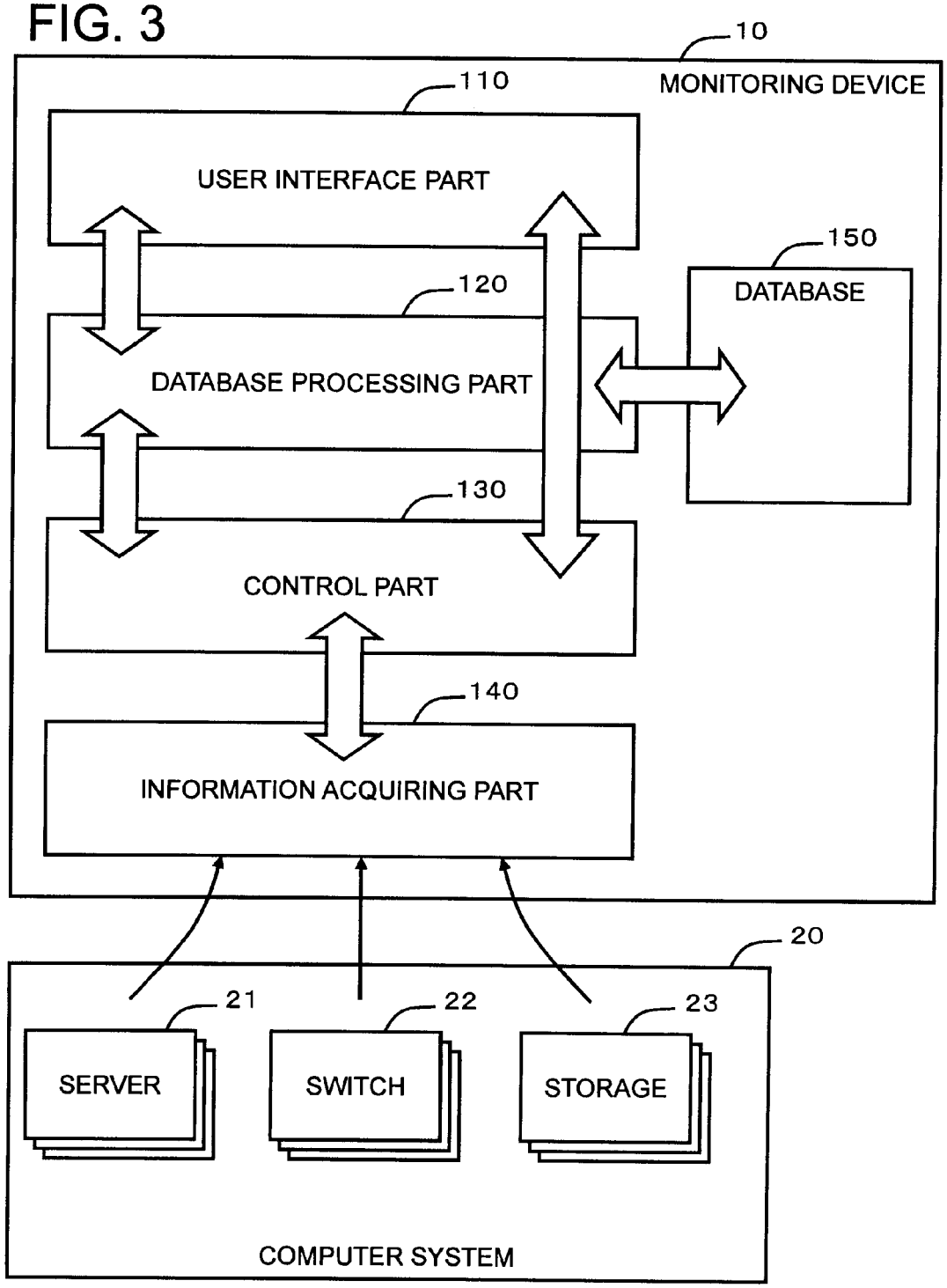
FIG. 3 is a block of diagram of a monitoring apparatus.

Furthermore, the monitoring method setting part 3A, the monitoring part 3C and the monitoring method changing part 3D are realized in accordance with the collaboration of the control part 130, the user interface part 110, and the database processing part 120 shown in FIG. 3. The information acquiring part 140 shown in FIG. 3 corresponds to the information acquiring part 3B, and the user interface part 110 shown in FIG. 3 corresponds to the user interface 6.

In FIG. 2, a plurality of servers are shown as nodes. The one server 21A creates a virtual server (214A). The server 21A comprises a communication port 210A, a microprocessor 211A, a host OS 212A, a plurality of virtualization mechanisms 213A, and a plurality of guest OSs 214A.

The virtualization mechanism 213A is a component of the host OS 212A. The virtualization mechanism 213A is software for creating the guest OS 214A on the host OS. The host OS 212A is one node. The guest OS 214A is one node that differs from the host OS 212A. The communication port 210A and the microprocessor 211A are the components that configure the server 21A. The guest OS 214A may also be called a virtual server or a virtual machine, which has been created virtually.

The other one server 21B comprises a communication port 210B, a microprocessor 211B, and a hard disk drive 215B. These communication port 210B, microprocessor 211B, and hard disk drive 215B are the components that configure the server 21B.

In the following explanation, in a case where it is not necessary to distinguish between the server 21A and the server 21B, they will be called the "server 21". Similarly, communication port 210B and the microprocessor 211B may be called the "communication port 210" and the "microprocessor 211".

The switch 22 is a node that is communicably coupled between the plurality of servers 21 and the plurality of storages 23 inside the computer system. The switch 22 comprises a plurality of communication ports 220 (switch ports 220) as components.

The storage 23 is a node for storing data that is used by the server 21. The storage 23 comprises a communication port 230, a microprocessor 231, and a hard disk drive 232 as components.

The monitoring apparatus 10 is communicably coupled between the servers 21, the switch 22 and the storage 23 by way of a first communication network CN1. The servers 21, the switch 22 and the storage 23 are coupled via a communication network CN2. The first communication network CN1 is the communication network for management, and, for example, is configured like a LAN (Local Area Network). The second communication network CN2 is the communication network for I/O (Input/Output), and, for example, is configured like a FC_SAN (Fibre Channel_Storage Area Network) or an IP_SAN (Internet Protocol_SAN). The configuration may also utilize a single communication network.

FIG. 3 is a block diagram showing the configuration of the monitoring apparatus 10. The monitoring apparatus 10, which serves as the "management system", is configured as a computer apparatus comprising a microprocessor, a memory, and a communication interface as described using FIG. 1.

The monitoring apparatus 10, for example, comprises a user interface part 110, a database processing part 120, a control part 130, an information acquiring part 140, and a database 150.

The user interface part 110 is a function for exchanging information with the user. The user interface part 110 is respectively coupled to the database processing part 120 and the control part 130. A condition or the like inputted by the user is transferred to either the database processing part 120 or the control part 130 via the user interface part 110. The user is notified of the processing result of either the database processing part 120 or the control part 130 via the user interface part 110. The configuration may also be such that information is provided to the user using electronic mail and the like.

The database processing part 120 is a function for controlling the database 150. The database processing part 120 acquires data requested by the user interface part 110 from the database 150, and returns this data to the user interface part 110. In addition, the database processing part 120 updates the database 150 in accordance with a request from the control part 130.

The control part 130 is a function for controlling the operation of the monitoring apparatus 10. The control part 130 processes information inputted from either the user interface part 110 or the information acquiring part 140. The control part 130 either updates the database 150 by way of the database processing part 120, or provides information to the user via the user interface part 110.

The information acquiring part 140 is a function for acquiring information from the nodes and components inside the computer system 20. Furthermore, the nodes and components inside the computer system 20 may be referred to generically as the IT (Information Technology) resources.

The monitoring apparatus 10 need not directly comprise the user interface part 110. For example, the configuration may be such that an operation terminal for operating the monitoring apparatus 10 is coupled to the monitoring apparatus 10, and an operation is received from the user and a notification is issued to the user via this operation terminal. A configuration in which a display terminal and an operation terminal are coupled to the monitoring apparatus 10, and a configuration in which only the display terminal is coupled to the monitoring apparatus 10 and the input device of the monitoring apparatus 10 is used for operations may also be used. Furthermore, the monitoring apparatus 10 need not be configured as a single computer apparatus, but rather a single monitoring apparatus 10 may be configured from a plurality of computer apparatuses.

Figure 4:
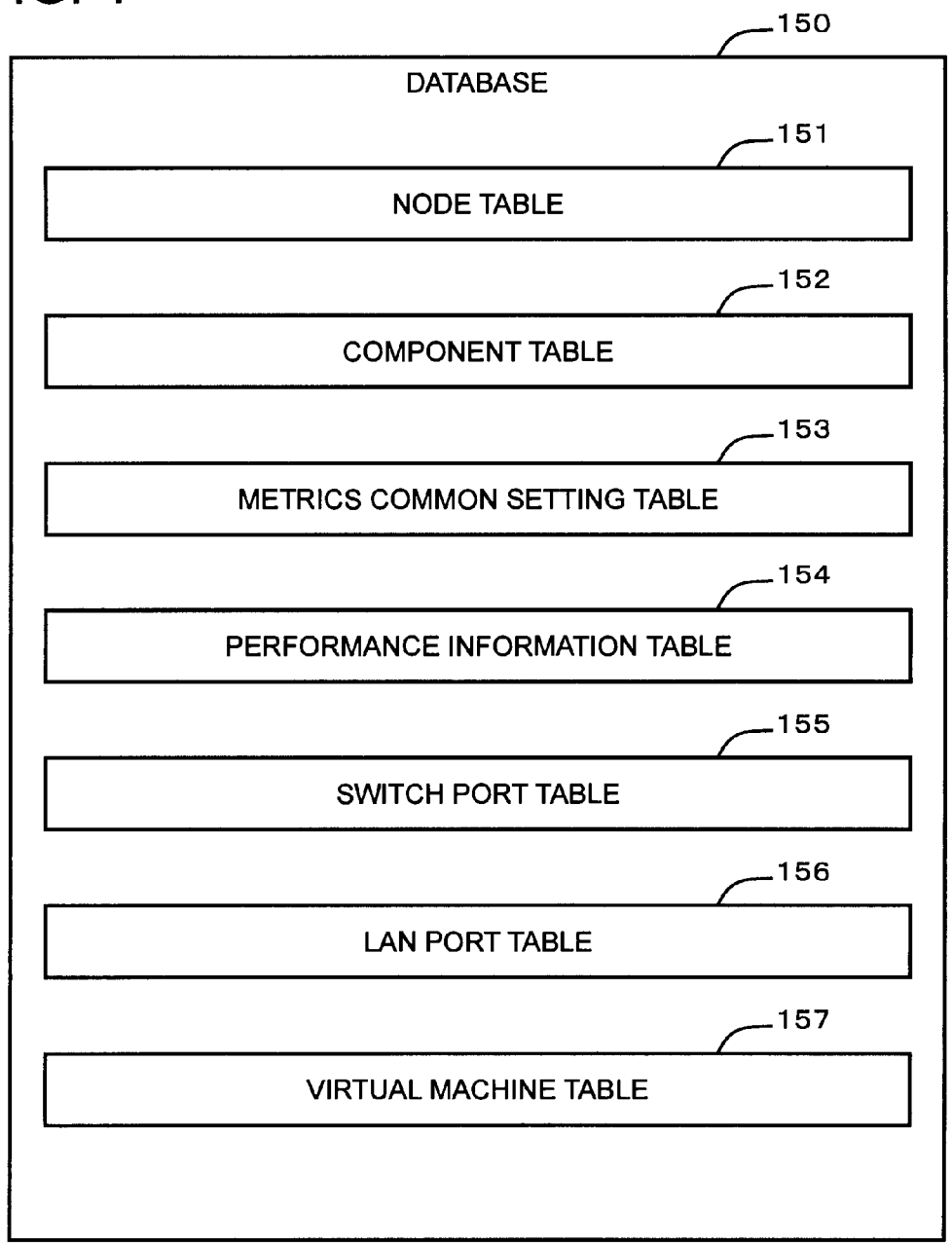
FIG. 4 is a diagram showing the configuration of database.

FIG. 4 shows the configuration of the database 150. In the database 150, for example, there is stored a node table 151, a component table 152, a metrics common setting table 153, a performance information table 154, a switch port table 155, a LAN port table 156, and a virtual machine table 157. The configurations of the respective table 151 through 157 will be described below. Furthermore, the configuration of the database 150 and the configurations of the respective tables 151 through 157 are not limited to the examples shown in the drawings. For example, a single table may be configured from a plurality of tables, or a plurality of tables may be bundled together into a single table.

The terms "table", "list" and "queue" will be used below to explain the configuration of the information utilized in this example, but the configuration of the information is not limited to these formats. That is, the respective information utilized in this example may be a data structure other than a table, a list, or a queue. In addition, the expressions "identification information", "identifier", "ID", and "name" will be used to explain the contents of the respective information, and these expressions are interchangeable.

Figure 5:
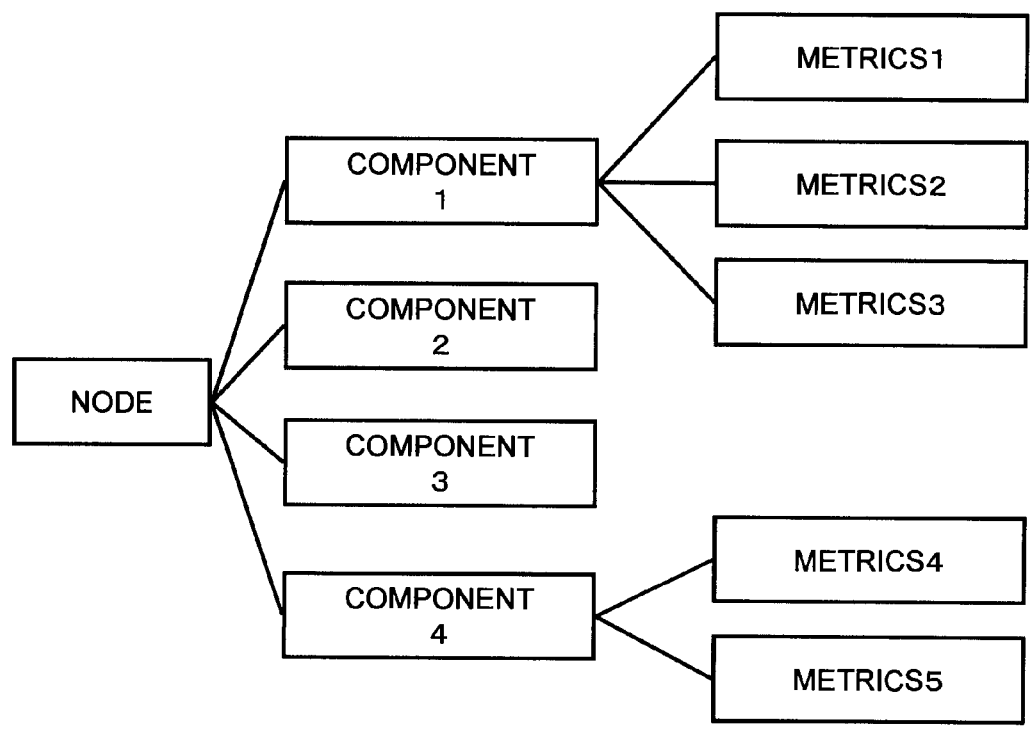
FIG. 5 is a diagram showing the relationship between a node, components and metrics.

FIG. 5 schematically shows the relationship between the node, the components, and the metrics. The node, which is an element of the computer system, comprises one or more components. The component may comprise either one or a plurality of metrics.

The node, for example, may include the server 21, the switch 22, and the storage 23. The component, for example, may be a microprocessor, a communication port (a switch port or a LAN port), a memory, a hard disk drive, or a virtualization mechanism.

The metrics is either a measurement criteria or a determination index. For example, in a case where the component is a microprocessor, the metrics may include the CPU operation rate or the like. In a case where the component is a hard disk drive, the metrics may include the read load, the write load, or the disk transfer time (These are average values. The same holds true below.). In a case where the component is a communication port, the metrics may include the quantity of packets received (This is an average value. The same holds true below.) and the quantity of packets sent (This is an average value. The same holds true below.). The monitoring apparatus 10 determines whether or not an abnormality has occurred in the components by monitoring the metrics of the components.

Figure 6:
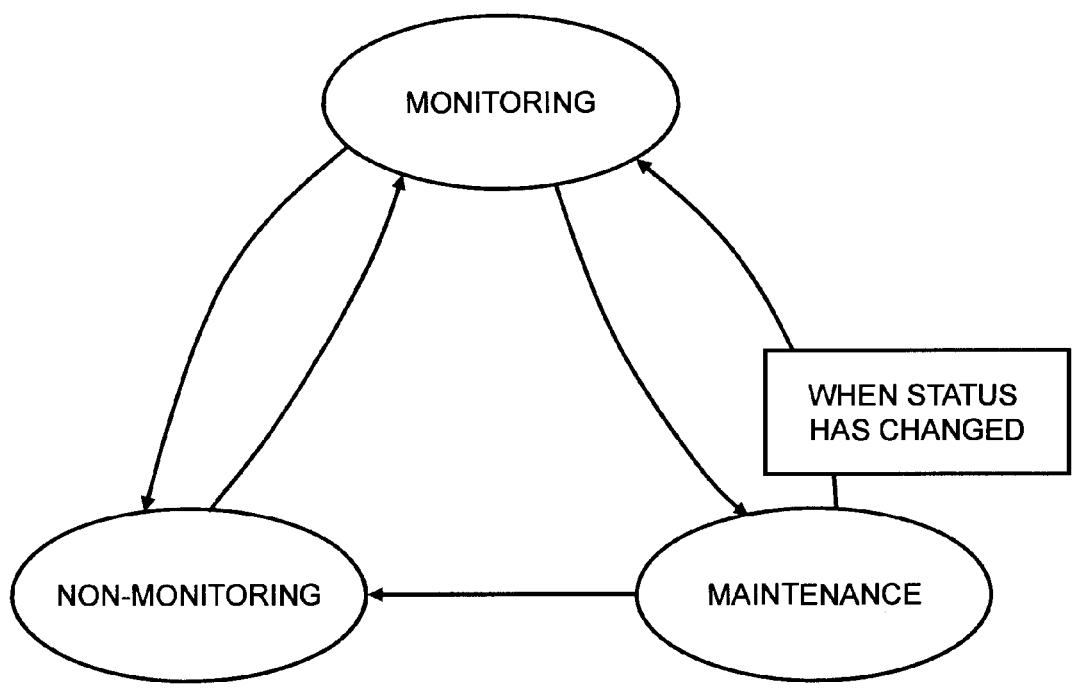
FIG. 6 is a diagram showing the relationship between a monitoring mode, a non-monitoring mode, and a maintenance mode.

FIG. 6 schematically shows the component monitoring method by the monitoring apparatus 10. The component monitoring method comprises the following three states (modes). The first state is the monitoring status of the "first mode". The second state is the non-monitoring status of the "second mode". The third state is the maintenance status of the "third mode".

When the component is set to the monitoring mode, the monitoring apparatus 10 monitors this component based on the information collected from the component. The monitoring apparatus 10, in a case where the metrics value has exceeded a prescribed threshold or falls below the prescribed threshold, outputs an alert.

When the component is set to the non-monitoring mode, the monitoring apparatus 10 does not monitor this component. The monitoring apparatus 10 ignores the information collected from this component, does not compare the metrics value to the threshold, and does not output an alert.

When the component is set to the maintenance mode, the monitoring apparatus 10 treats this component as normal. That is, even in a case where a link-down or other such failure signal is detected from this component, the monitoring apparatus 10 treats this component as being normal. When the status of the component that is in the maintenance mode changes further, the monitoring apparatus 10 shifts from the maintenance mode to the monitoring mode. In a case where a failure has occurred in this component, the monitoring apparatus 10 outputs an alert.

Transitioning is possible in both directions between the monitoring mode and the non-monitoring mode. A transition from the monitoring mode to the maintenance mode and a transition from the maintenance mode to the monitoring mode are also possible. As described hereinabove, the transition from the maintenance mode to the monitoring mode may be carried out automatically as the result of a change in the component status. A transition from the maintenance mode to the non-monitoring mode is possible. A transition from the non-monitoring mode to the maintenance mode is not possible. A transition from the non-monitoring mode is only possible to the monitoring mode. Furthermore, the mode transitions of the monitoring method described above are provided as examples, and the present invention is not limited to the examples shown in FIG. 6.

Figure 7:
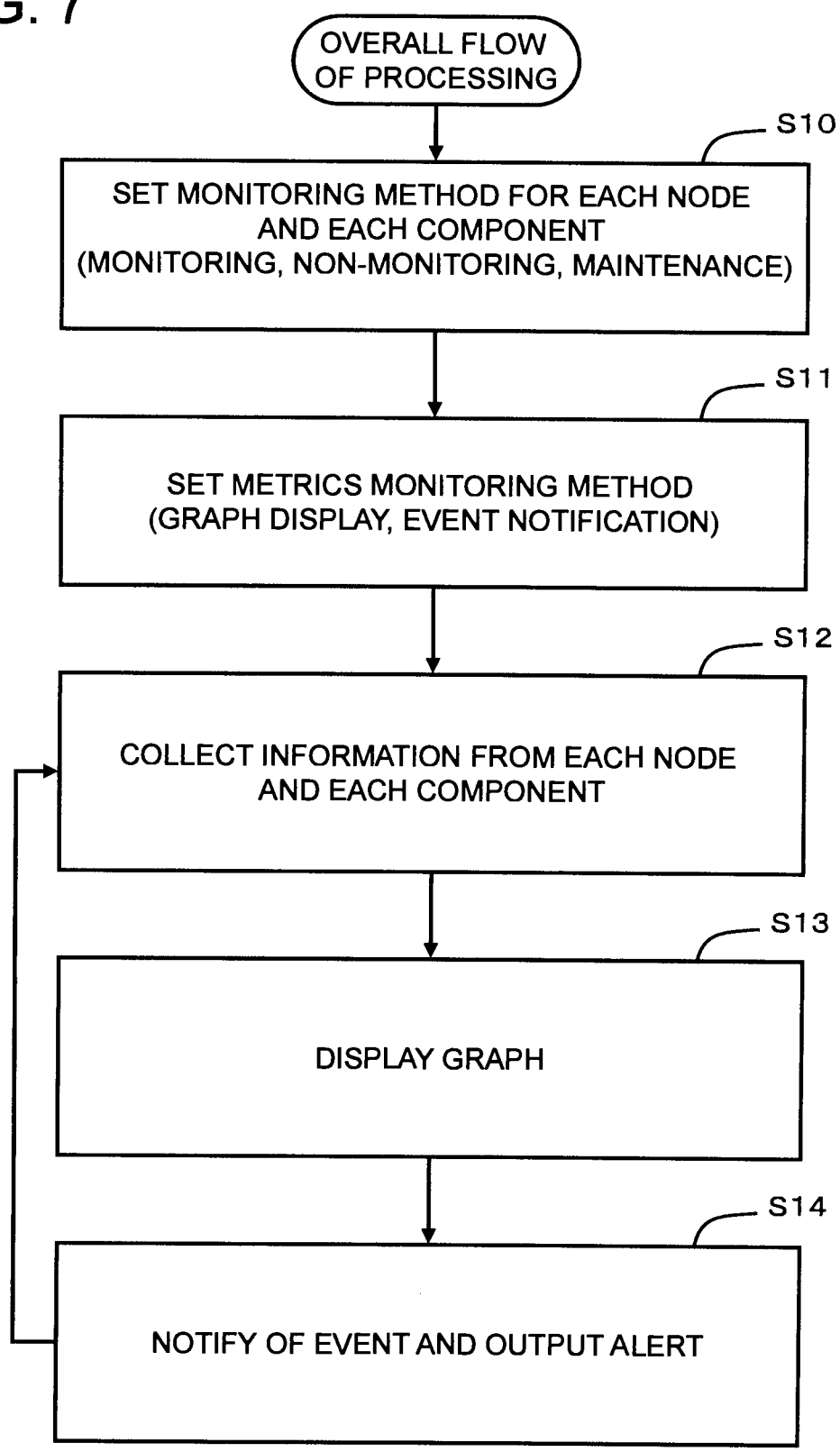
FIG. 7 is a flowchart showing the overall flow of processing of monitoring.

FIG. 7 is a flowchart showing the overall flow of processing of the monitoring method. The processes described hereinbelow are realized by the microprocessor reading in and executing the programs stored in the memory. Therefore, either program or microprocessor may be used as the subject in the following explanations of the respective processes. Or, the explanations may also use monitoring apparatus, controller, or server as the subject of the sentences used to describe the processes below.

A configuration in which either all or a portion of the programs are realized in the form of dedicated hardware circuits may be used. The programs may be installed in a file server by way of a program delivery server for delivering programs. In addition, programs that are contained on recording media may be installed by reading the programs into the file server.

As shown in FIG. 7, first, the user sets the monitoring method for each IT resource (each node and each component) (S10). Three types of monitoring methods are prepared beforehand: a monitoring status (the monitoring mode), a non-monitoring status (the non-monitoring mode), and a maintenance status (the maintenance mode).

The user is able to set the appropriate monitoring method in accordance with the situation. For example, in a case where ordinary monitoring is desired, the user sets this IT resource to the monitoring mode. For example, in a case where an IT resource that is not being used is to be removed from the computer system 20, the user sets this IT resource to the non-monitoring mode. In accordance with this, an alert will not be outputted from the monitoring apparatus 10 even when this unused IT resource is disconnected from the computer system 20.

For example, in the case of maintenance work, the user sets the IT resource, which is the target of the maintenance work, to the maintenance mode. During the maintenance work, the actual status of the IT resource, which is the maintenance work target, is "abnormal". However, the monitoring apparatus 10 does not output at alert because the IT resource, which has been set to the maintenance mode, is treated as being normal. Even when the user is carrying out maintenance work like this, such as replacing a part, an alert is not outputted for the IT resource that has been set to the maintenance mode.

When the maintenance work is finished, the actual status of this IT resource automatically transitions from "abnormal" to "normal". Therefore, after the maintenance work, the user does not have to manually return the maintenance-targeted IT resource to the monitoring mode. In a case where a failure occurs in this IT resource subsequent to the maintenance work, the monitoring apparatus 10 outputs an alert.

Next, the user is able to set a metrics monitoring method for each component (S11). The metrics monitoring method, for example, comprises settings indicating whether or not a graph is to be displayed and whether or not an event is to be notified. The monitoring apparatus 10 is able to display a graph of chronological changes in the performance information (metrics information) collected from the component. The monitoring apparatus 10 is also able to compare the performance information collected from the component to a prescribed threshold, and issue a notification when an event occurs. The graph display and event notification are provided to the user via the user interface part 110.

The monitoring apparatus 10 acquires and stores information from the IT resources inside the computer system 20 via the information acquiring part 140 (S12). The monitoring apparatus 10 displays a graph showing changes in the performance information in accordance with the contents that were set in S11 (S13). The monitoring apparatus 10 notifies of an event and/or outputs an alert based on the status of the IT resource (S14).

FIG. 8 shows the node table 151. The node table 151 is for managing the nodes. The node table 151, for example, comprises a node ID 1510, a node name 1511, a type 1512, a status 1513, a monitoring status 1514, a common setting 1515, and a virtual server host ID 1516.

The node ID 1510 is information that uniquely identifies each node inside the computer system. The node name 1511 is the name of the node. The type 1512 denotes the type of node. The node types, for example, are a server, a switch, and a storage. The status 1513 denotes the status of the node. The status 1513, for example, may be "normal" or "abnormal". The monitoring status 1514 denotes the monitoring method selected for the node. The values capable of being set in the monitoring status 1514, as mentioned above, are "monitoring", "non-monitoring", and "maintenance". The common setting 1515 denotes whether or not the "metrics common setting", which will be described hereinbelow, is to be applied. The virtual server host ID 1516 is information for identifying the host that has been provided in the virtual server. In a case where the node is a virtually constructed server (called either a virtual server or a virtual OS), this host ID 1516 identifies the node in which this virtual server has been constructed.

FIG. 9 shows the component table 152. The component table 152 is for managing the components. The component table 152, for example, comprises a component ID 1520, a component name 1521, a type 1522, anode ID 1523, a status 1524, a monitoring status 1525, and a common setting 1525.

The component ID 1520 is information that uniquely identifies a component inside the computer system. The component name 1521 is the name of the component. The type 1522 denotes the type of component. The component type, for example, may be a microprocessor, a hard disk drive, or a virtualization mechanism (VM in the drawing). The node ID 1523 is information for identifying the node to which the component belongs. The status 1524 denotes the status of the component. The component statuses are normal and abnormal. The monitoring status 1525 denotes the monitoring method for the component. The component monitoring method may be one of three kinds: "monitoring", "non-monitoring", and "maintenance". The common setting 1526 is information denoting whether or not the metrics common setting is applied.

FIG. 10 shows the metrics common setting table 153. The metrics common setting table 153 manages the setting value for each type of metrics. The metrics common setting table 153, for example, comprises a metrics type 1530, a graph display 1531, an event notification 1532, an alert threshold 1533, and an abnormal threshold 1534.

The metrics type 1530 is information showing the type of metrics. The metrics type, for example, may be "CPU operation rate", "quantity of packets received", "quantity of packets sent", "disk write load", and "disk read load". The graph display 1531 is a graph showing whether or not metrics-related information (performance information) is displayed in graph form. "True" is set in a case where the graph is displayed, and "false" is set in a case where the graph is not displayed.

The event notification 1533 is a graph showing whether or not a notification is to be issued when an event occurs. "True" is set in a case where an event is notified, and "false" is set in a case where an event is not notified.

The alert threshold 1533 shows the threshold for outputting an alert as an event. An alert is outputted when the value of the metrics either exceeds the alert threshold or falls short of this threshold. For example, in a case where the metrics type is microprocessor operation rate, an alert is outputted when the microprocessor operation rate exceeds 80%. As another example, in a case where the metrics type is memory remaining, an alert is outputted when the remaining memory is less than 1000 MB.

The abnormal threshold 1534 shows the threshold for outputting an abnormal alert as another event. The abnormal alert denotes a greater sense of urgency than an ordinary alert. An abnormal alert is outputted when the metrics value has either exceeded the abnormal threshold or fallen below the abnormal threshold. When the microprocessor operation rate exceeds 90% in the above-mentioned example, an abnormal alert is outputted. An abnormal alert is outputted when the remaining memory falls below 500 MB. In a case where the event notification 1532 is set to "false", it is not possible to set values in the alert threshold 1533 and the abnormal threshold 1534.

FIG. 11 shows the performance information table 154. The performance information table 154 denotes the management method for the performance information collected from the nodes and the components (IT resources). The performance information table 154, for example, comprises a component ID 1540, a metrics ID 1541, a metrics type 1542, a status 1543, a graph display 1544, and an event notification 1545.

The component ID 1540 is information identifying a component from which performance information has been acquired. The metrics ID 1541 is information for identifying the performance information that has been acquired from the component. The metrics type 1542 denotes the type of performance information. The status 1543 denotes whether the performance information is normal or abnormal. The graph display 1544 denotes whether or not the performance information is displayed in graph form. The event notification 1545 denotes whether or not an event notification is to be issued for the performance information.

FIG. 12 shows the switch port table 155. The switch port table 155 is for managing the communication ports (switch ports) of the switch 22.

The switch port table 155, for example, comprises a port ID 1550, a component ID 1551, and a MAC address 1552. The port ID 1550 is information for identifying the switch ports. The component ID 1551 is information identifying the component (that is, the switch 22) that comprises the switch port. The MAC address 1552 shows the MAC (Media Access Control) address that is allocated to the switch port.

FIG. 13 shows the LAN port table 156. The LAN port table 156 is for managing the communication port (LAN port) of either the server 21 or the storage 23. In this example, this communication port is called the LAN port, but the communication network configuration does not have to be a LAN.

The LAN port table 156, for example, comprises a port ID 1560, a component ID 1561, a MAC address 1562, and a destination switch port MAC address 1563. The port ID 1560 is information for identifying the LAN port. The component ID 1561 is information for identifying the apparatus (either the server or the storage) that comprises the LAN port. The MAC address 1562 denotes the MAC address that is allocated to the LAN port. The destination switch port MAC address 1563 is the MAC address of the switch port that is coupled to the LAN port. Furthermore, the configuration of the switch port table 155 may be provide a column for managing the MAC address of the LAN port that is coupled to the switch port. In the case of this configuration, the destination switch port MAC address column 1563 may be removed from the LAN port table 156.

Figure 14:
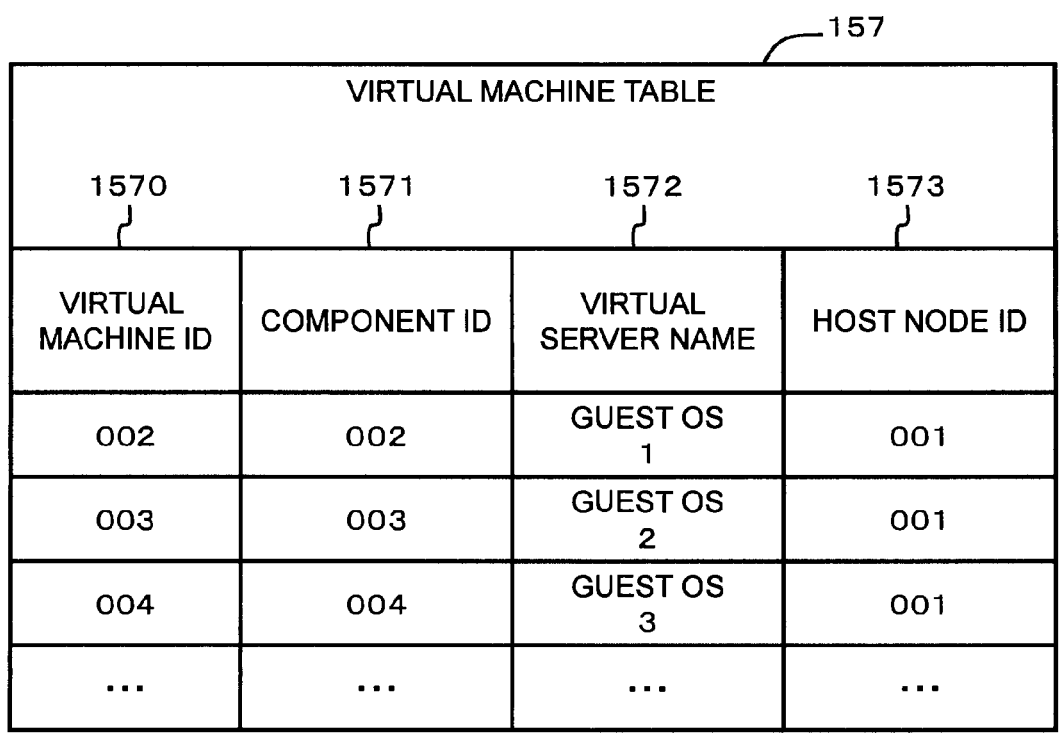
FIG. 14 is an example of the configuration of a virtual machine table.

FIG. 14 shows a virtual machine table 157. The virtual machine table 157 is the table that manages the virtualization mechanism 213A. The virtual machine table 157, for example, comprises a virtual machine ID 1570, a component ID 1571, a virtual server name 1572, and a host node ID 1573.

The virtual machine ID 1570 is information for identifying the virtual machines (that is, the virtualization mechanisms). The component ID 1571 denotes the component ID that is allocated to the virtual machine. The virtual server name 1572 is the name for identifying the virtual server disposed on the virtual machine. The host node ID 1573 is information for identifying the host on which the virtual machine is disposed.

Figure 15:
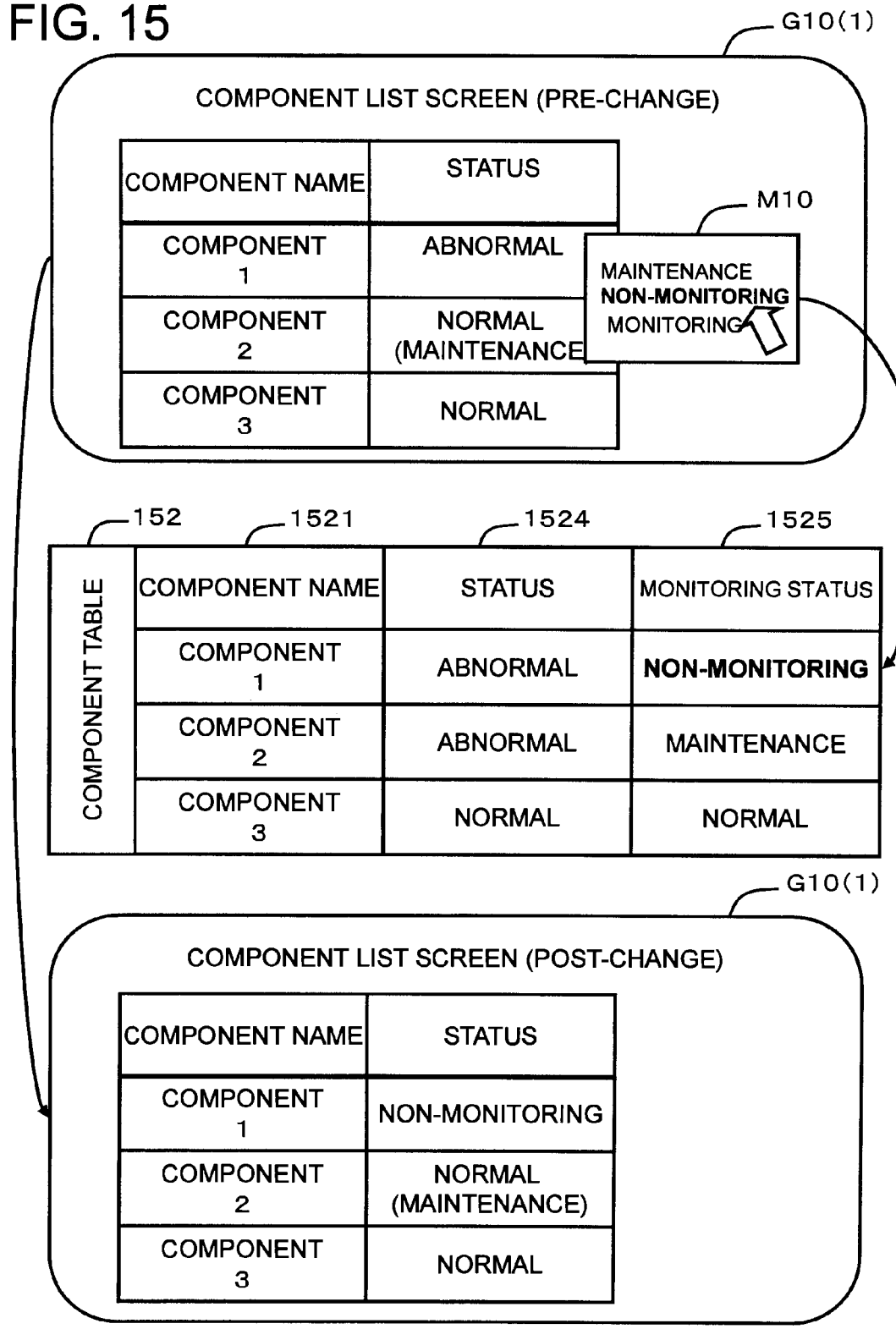
FIG. 15 is a diagram showing a method for changing the monitoring status for a component.

FIG. 15 shows how a monitoring method can be set for each component, and, in addition, how the setting content can be changed afterwards. The component list screen G10(1) shown at the top of FIG. 15 shows the pre-change setting. The other component list screen G10(2) shown at the bottom of FIG. 15 shows the post-change setting. The component list screens G10(1) and G10(2) are presented to the user via the user interface part 110. The component list screen G10 is a screen for displaying a list of the names and statuses of the components inside the computer system.

In the examples shown in screen G10(1), the user right clicks on the column that shows the status of the "component 1" and displays a menu M10 to change the monitoring method of the "component 1". This menu M10 displays the three modes that can be selected as the monitoring method. Furthermore, the current monitoring method may be displayed as unselectable. A case will be explained here in which "monitoring" is set here as the current monitoring method of the "component 1", and the user changes the monitoring method from "monitoring" to "non-monitoring". In the following explanation, the portion of each table related to the explanation may be selected and displayed.

When the user selects "non-monitoring" from the menu M10 in order to select the monitoring method, the monitoring apparatus 10 rewrites the monitoring status 1525 of the component table 152 to "non-monitoring". In accordance with this, the component list screen G10(2) displays the status of the "component 1" as "non-monitoring".

Figure 16:
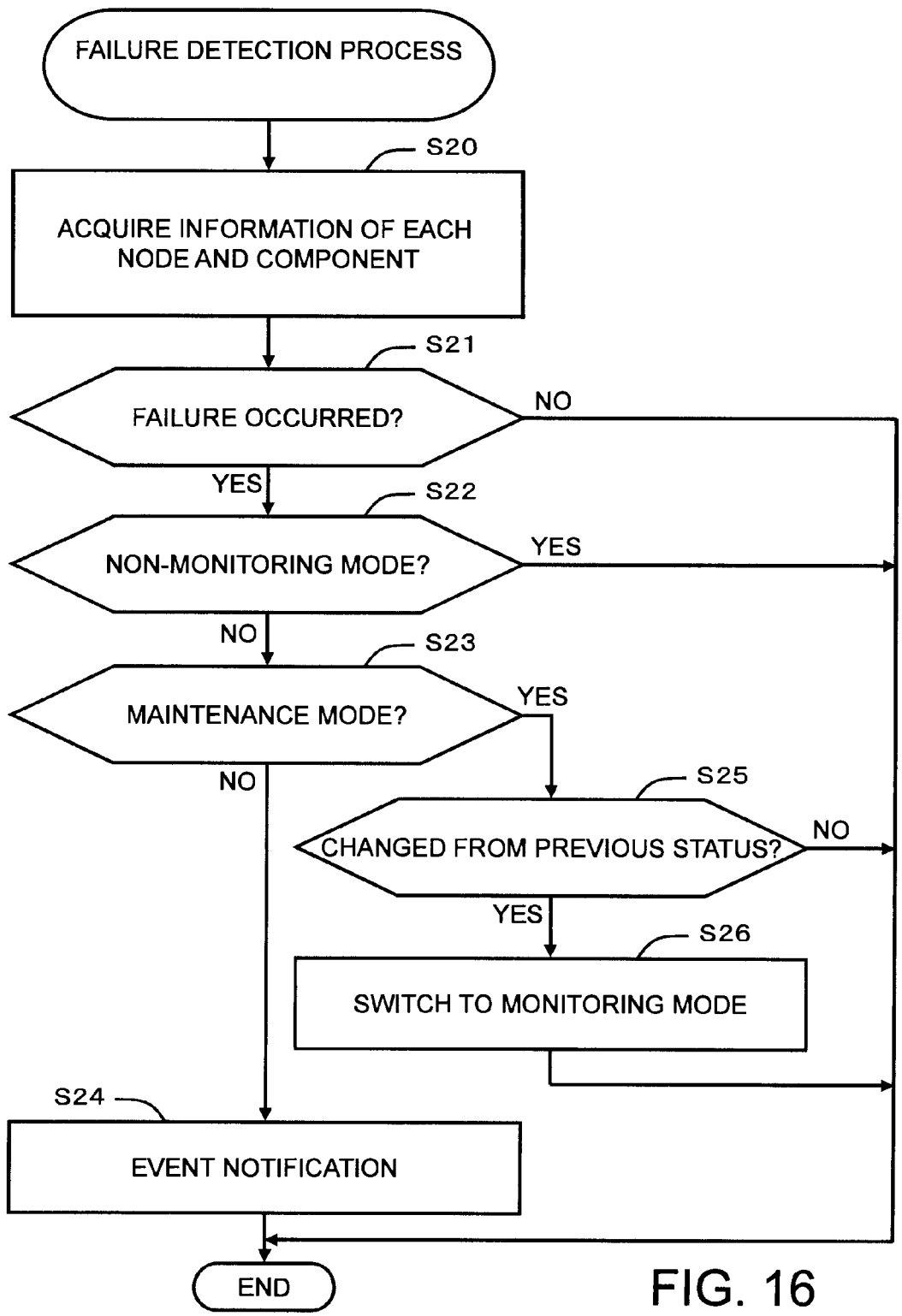
FIG. 16 is a flowchart of a failure detection process.

FIG. 16 is a flowchart showing the processing for detecting a failure. The monitoring apparatus 10 acquires the information of the IT resources via the information acquiring part 140 (S20). Node and component are shown in the drawing, but the nodes and components may be called IT resources here. The monitoring apparatus 10 determines whether or not a failure has occurred in this IT resource by comparing the acquired information to the prescribed threshold (S21). In a case where a failure has not occurred (S21: NO), this processing ends.

In a case where a failure has occurred (S21: YES), the monitoring apparatus 10 determines whether or not the non-monitoring mode is set for the IT resource in which the failure was detected (S22). In a case where the non-monitoring mode is set (S22: YES), this processing ends.

In a case where the non-monitoring mode is not set for the failed IT resource (S22: NO), the monitoring apparatus 10 determines whether or not the maintenance mode is set for this IT resource (S23). A case in which the maintenance mode is not set (S23: NO) means that the monitoring mode is set for this IT resource, and the monitoring apparatus 10 therefore notifies the user of an event corresponding to the type and extent of the failure (S24).

In a case where the maintenance mode is set for the failed IT resource (S23: YES), the monitoring apparatus 10 determines whether or not the status of this IT resources has changed from the previous status (S25). In a case where the status of the IT resources that is set to the maintenance mode has not changed (S25: NO), this processing ends.

In a case where the IT resource is set to the maintenance mode (S25: YES), the monitoring apparatus 10 switches the maintenance mode to the monitoring mode and ends this processing (S26). Furthermore, in the case of a configuration in which the maintenance mode automatically transitions to the monitoring mode subsequent to the end of maintenance, S25 and S26 are unnecessary.

In either case, when the IT resource is set to the maintenance mode, the user expects a failure to be detected in this IT resource. Therefore, the monitoring apparatus 10 does not notify of an event. In accordance with this, it is possible to curb unnecessary event notifications, and to focus the user's attention on important events that the user needs to be aware of.

FIG. 17 shows metrics monitoring control. The table in FIG. 17 is an explanatory table for showing the configuration for metrics monitoring control, and does not actually exist and is not stored inside the monitoring apparatus 10.

The method for monitoring the metrics will differ in accordance with the combination of C100, i.e., whether or not performance information is acquired, and C101, i.e., whether or not a metrics status determination is made. The contents of the notification C102 to the user will also differ as a result of this.

In a case where the performance information is acquired, either one of determine the metrics status or do not determine the metrics status may be selected. In a case where the metrics status is to be determined, the metrics status is determined by comparing the acquired performance information to the prescribed threshold. In a case where the performance information is acquired and the metrics status is determined, the monitoring apparatus 10 displays a graph of the performance information, and notifies the user that an event has occurred.

In a case where the performance information is acquired but a metrics status determination in not made, the monitoring apparatus 10 displays the performance information graph but does not notify of an event.

In a case where the performance information is not acquired, it is not possible to make a metrics status determination. The monitoring apparatus 10 neither displays a graph nor notifies of an event. This is because without acquiring the performance information it is not possible to prepare a graph or make comparisons to a threshold.

FIG. 18 shows a metrics common setting screen G20. This screen G20 is for applying the metrics monitoring method shown in FIG. 17 to a plurality of metrics.

The metrics common setting screen G20, for example, comprises a graph display column GP20, an event notification column GP21, a metrics type column GP22, an alert threshold column GP23, and an abnormal threshold column GP24.

In a case where the graph display column GP20 is checked signifies that a graph will be displayed. Similarly, in a case where the event notification column GP21 is checked signifies that an event communication will be carried out. The metrics type column GP22 displays the type of metrics. The alert threshold column GP23 displays the threshold for generating an alert for this metrics. The abnormal threshold column GP24 displays a threshold value for generating a message to the effect that this metrics is abnormal.

In a case where the metrics type is "type 1" in the example shown in FIG. 18, a graph display and an event notification are carried out. Also in the case of the "type 1", a notification is generated when the value of the performance information related to the metrics type exceeds 80%, and an abnormal alert is generated when this value exceeds 90%.

In a case where the metrics type is "type 2", the graph is displayed, but an event notification is not issued. Because an event notification is not issued, the alert threshold column GP23 and the abnormal threshold column GP24 may be left blank. A threshold is displayed in FIG. 18 for reference.

In a case where the metrics type is "type 3", a graph is not displayed and an event notification is not issued. The same as above, the alert threshold column GP23 and the abnormal threshold column GP24 may be left blank, but for the sake of convenience, examples of thresholds are displayed.

The metrics type 1, for example, is the microprocessor operation rate. The metrics type 2, for example, is the remaining memory. The metrics type 3, for example, is either the quantity of packets received, or the quantity of packets sent. As shown in FIG. 18, in this example, the metrics monitoring methods are classified into patterns for each metrics type, thereby lessening the time spent by the user making settings.

Figure 19:
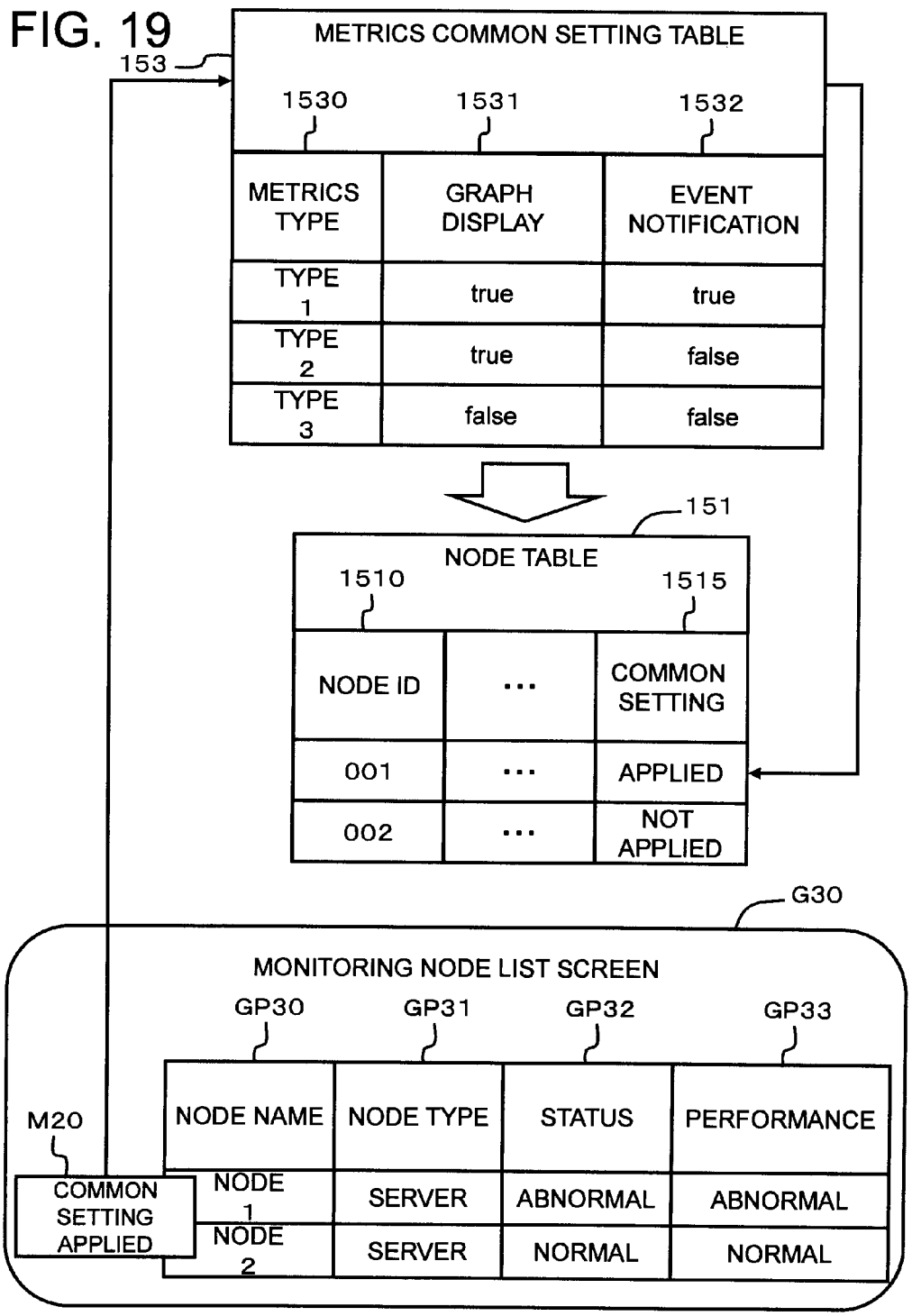
FIG. 19 is a diagram showing how a common setting is applied.

FIG. 19 shows how a metrics common setting, is applied to an entire node. In the bottom of FIG. 19, a monitored node list screen G30 is shown. The monitored node list screen G30 displays a list of the statuses of the nodes being monitored. The monitored node list screen G30, for example, comprises a node name column GP30, a node type column GP31, a status column GP32, and a performance column GP33.

The node name column GP30 displays the name of the node. The node type column GP31 displays the node type. The status column GP32 displays whether the node status is normal or abnormal. The performance column GP33 displays whether the status of the metrics related to this node is normal or abnormal.

The user selects a desired node (for example, the node of node ID 001) and right clicks. In accordance with this, a menu M20 for applying the metrics common setting is displayed on the screen. When the user gives an instruction to apply the metrics common setting, the setting contents (the contents of the metrics monitoring control) defined in the metrics common setting table 153 are applied to the selected node in its entirety. In the node table 151, "applied" is set in the common setting 1515 of the node selected by the user.

Figure 20:
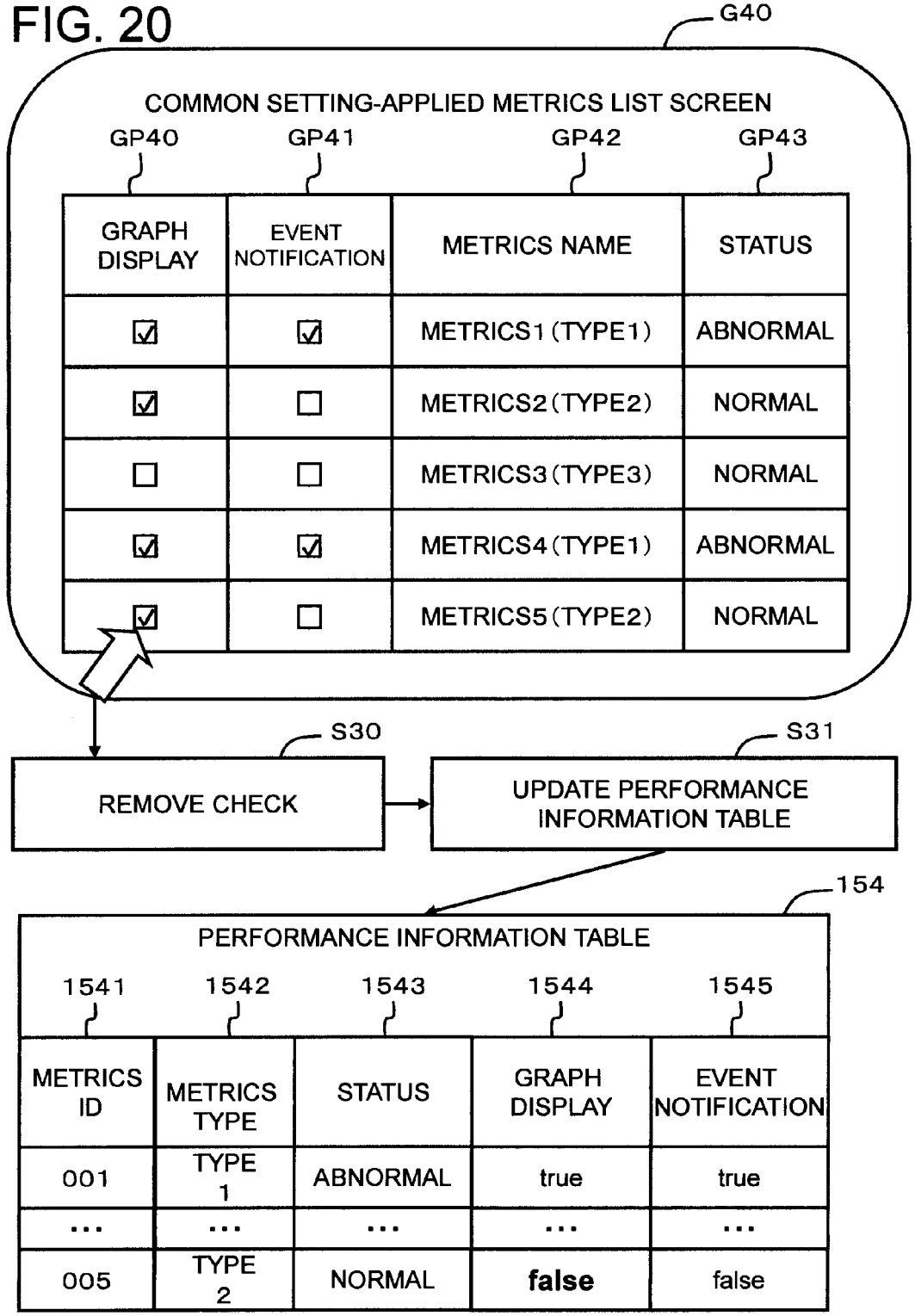
FIG. 20 is a diagram showing how to individually set metrics monitoring.

FIG. 20 shows a metrics list screen G40 in a case where the metrics common setting in FIG. 19 has been applied to the entire node. In the example of FIG. 19, the metrics common setting was applied to the entire node of node ID 001. For this reason, a common value of the plurality of metrics included in this node is set for each type.

The metrics list screen G40, for example, comprises a graph display column GP40, an event notification column GP41, a metrics name column GP42, and a status column GP43. The graph display column GP40 shows whether or not a graph is displayed. A case in which a checkmark has been set indicates that a graph is displayed. The event notification column GP41 shows whether or not an event notification is to be issued. A case in which a checkmark has been set indicates that an event notification is issued. The metrics name column GP42 shows the metrics name and the metrics type. The status column GP43 shows whether or not the metrics is normal.

As also shown in FIG. 18, in the metrics type 1, a graph display and an event notification are carried out, in the metrics type 2, only the graph display is carried out, and in the metrics type 3, neither the graph display nor the event notification are carried out. In a case where the metrics common setting has been applied to the entire node, the graph display and the event notification are carried out for the metrics 1 and the metrics 4 of the metrics type 1 as shown in the screen G40 of FIG. 20. Only the graph display is carried out for the metrics 2 and the metrics 5 of the metrics type 2. Neither the graph display nor the event notification is carried out for the metrics 3 of the metrics type 3.

In this way, the user is able to collectively set monitoring methods for an entire node that comprises a plurality of metrics, thereby enhancing usability. In addition, the user is also able to manually change a portion of the metrics common settings.

For example, in a case where the graph display of the metrics 5 is to be suspended, the user removes the checkmark from the graph display column GP40 of the metrics 5 (S30). The monitoring apparatus 10 changes the value of the graph display 1544 corresponding to the metrics ID for which the checkmark was removed by the user of the performance information table 154 to "false" (S31).

In this example, it is possible to collectively apply a common monitoring setting that has been prepared beforehand to a plurality of metrics of the same type in this way, and it is also possible to change a portion of the commonly set values in accordance with the desire of the user. In accordance with this, user convenience is enhanced.

Figure 21:
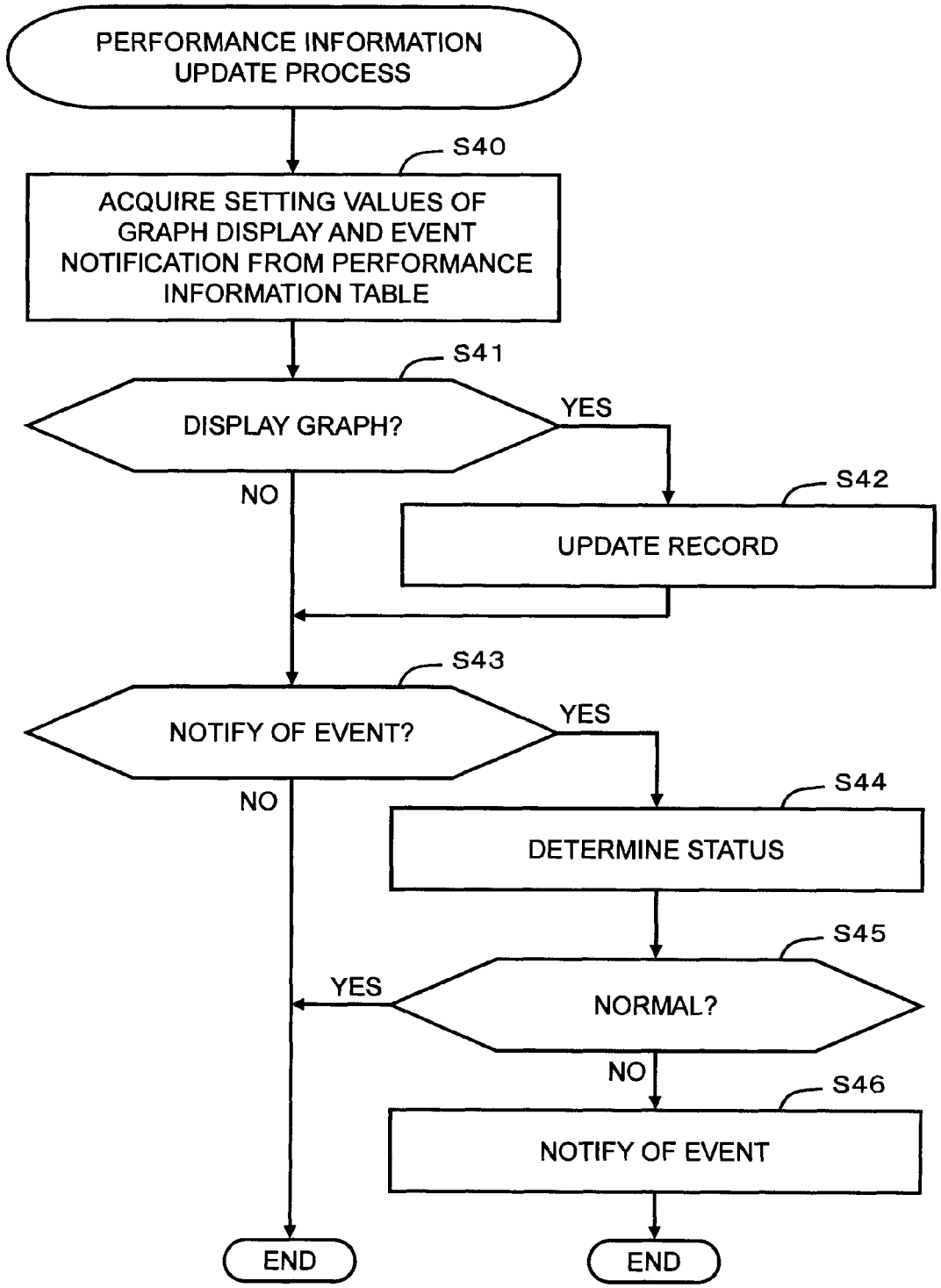
FIG. 21 is a flowchart showing the processing for updating performance information.

FIG. 21 is a flowchart showing a performance information updating process. The monitoring apparatus 10 respectively acquires the graph display 1544 setting value and the event notification 1545 setting value for each metrics from the performance information table 154 (S40).

The monitoring apparatus 10 determines whether or not the graph display is set for each metrics (S41). For a metrics for which the graph display has been set (S41: YES), the monitoring apparatus 10 stores the latest performance information thereof (S42).

The monitoring apparatus 10 determines whether or not the event notification is set (S43). In a case where the event notification is set (S43: YES), the monitoring apparatus 10 determines the metrics status by comparing the performance information to the threshold (S44). In a case where the metrics status is normal (545: YES), this processing ends. In a case where the metrics status is abnormal (S45: NO), the monitoring apparatus 10 issues an event notification (S46).

Figure 22:
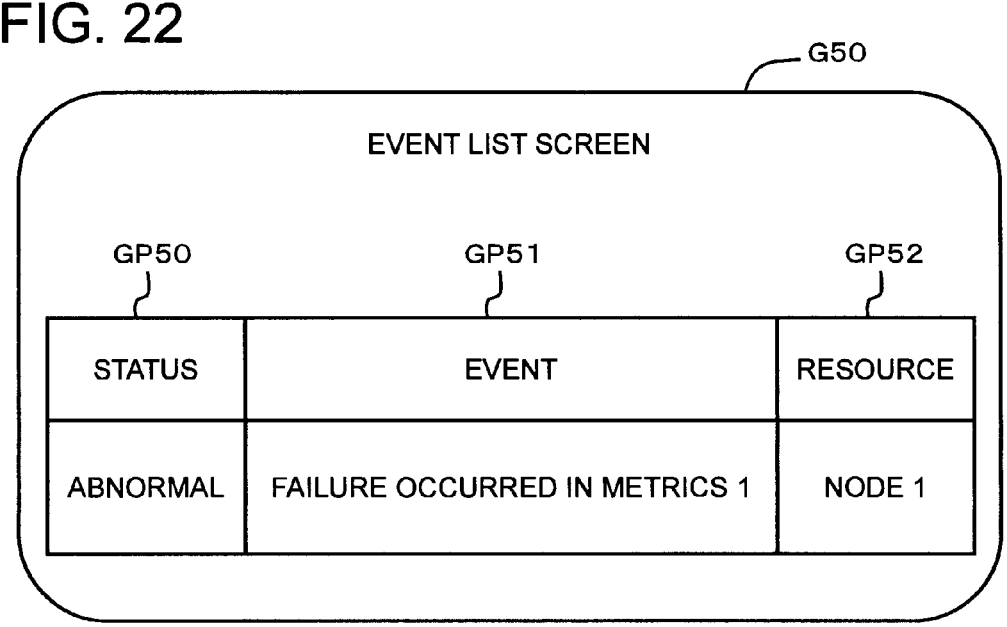
FIG. 22 shows an example of an event list screen.

FIG. 22 shows a screen G50 for notifying the user of the occurrence of an event. The event list screen G50 displays either one or a plurality of events that have occurred inside the computer system in list form. The event list screen G50, for example, comprises a status column GP50, an event column GP51, and a resource column GP52.

The status column GP50 shows whether the metrics is normal or abnormal. The event column GP51 shows the contents of the event. The resource column GP52 shows the resource (the node and component) in which the event occurred.

The user is able to easily check what kind of event has occurred and where inside the computer system this event has occurred by looking at the event list screen G50. As described above, in a case where the metrics monitoring method is set to either the non-monitoring mode or to the maintenance mode, an event is not displayed on the event list screen G50 even when a failure has occurred in this resource. This is because a failure that occurs in an IT resource that is set to either the non-monitoring mode or the maintenance mode is a scheduled failure, and the user is clearly aware of this failure. Therefore, only events that the user is not clearly aware of are displayed in the event list screen G50.

Figure 23:
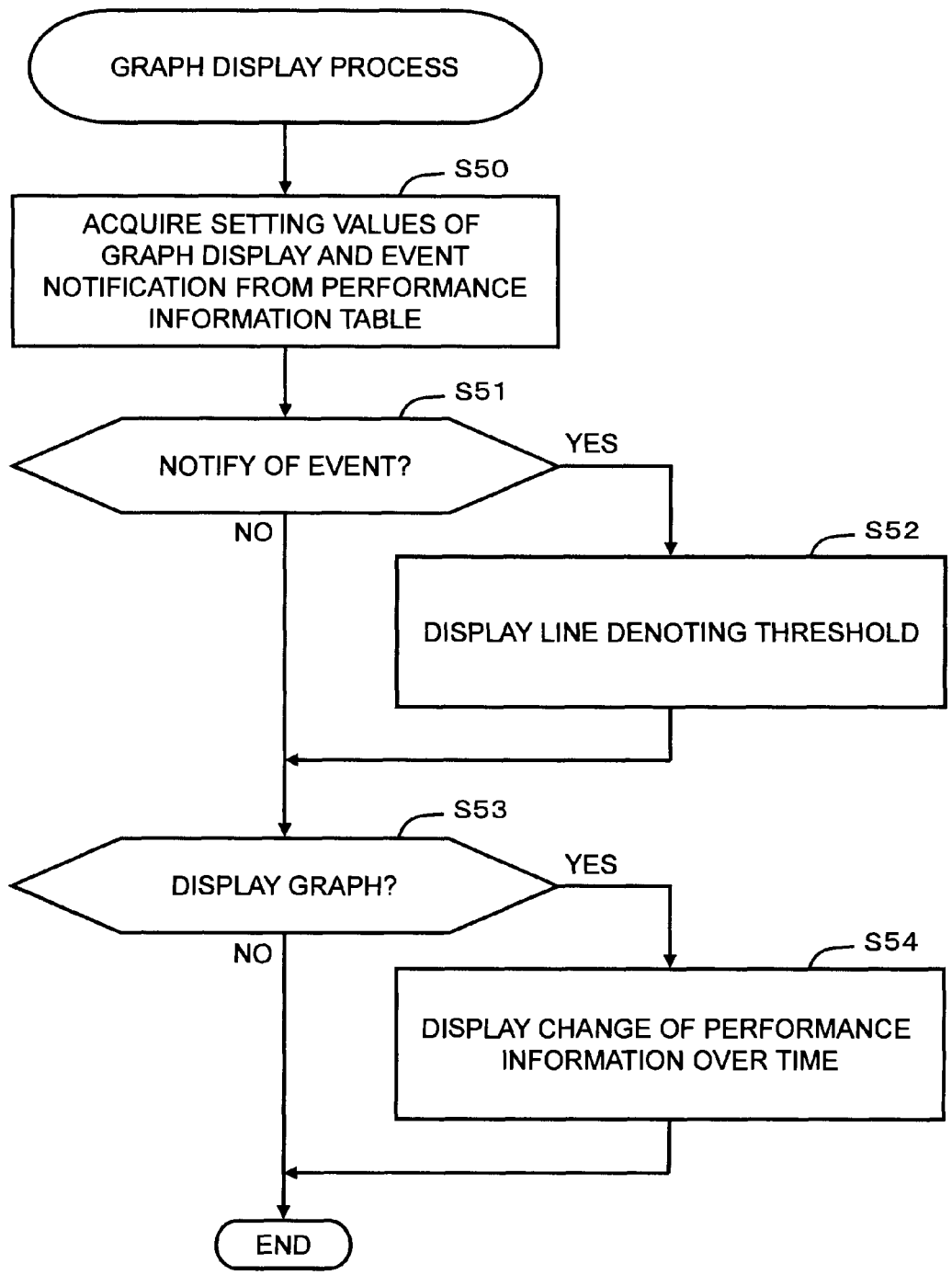
FIG. 23 is a flowchart of the processing for displaying a graph.

FIG. 23 is a flowchart showing graph display processing. The monitoring apparatus 10 respectively acquires the setting value of the graph display 1544 and the setting value of the event notification from the performance information table 154 (S50).

In a case where the event notification is set (S51: YES), the monitoring apparatus 10 displays a line denoting the threshold on a graph (S52). In a case where the event notification is not issued (S51: NO), or a case where the line denoting the threshold has been displayed in the graph (S52), the monitoring apparatus 10 determines whether or not the graph display is set (S53). In a case where the graph display has been set (S53: YES), the monitoring apparatus 10 creates a graph denoting the changes in the performance information over time, and outputs this graph from the user interface part 110 (S54).

FIG. 24 shows a performance information graph display. FIG. 24 shows a case in which the statuses of five types of metrics from metrics 1 through metrics 5 are displayable. For metrics 1 and 4, both the event notification and the graph display are specified. Therefore, in graphs GP60 and GP63 of these metrics 1 and 4, the line showing the threshold Th and the line showing the changes in performance information over time are displayed simultaneously. Since only the graph display is specified for metrics 2, only the line showing the changes in performance information over time is displayed in the graph GP61 of metrics 2, and the line showing the threshold is not displayed.

Alternatively, for metrics 3 and 5, the setting is such that neither the graph display not the event notification is displayed. Therefore, neither the line showing the threshold Th nor the line showing the changes in performance information over time is displayed for the graphs GP62 and GP64 corresponding to the metrics 3 and 5.

In this example, in a case where a plurality of monitoring targeted metrics are set like this, only the metrics for which the graph display is set are graphed. In addition, the line showing the threshold is superposably displayed only in the graphs of metrics for which the event notification is set. The user, by looking at the graph display screen G60 by metrics, is able to relatively easily discern what metrics are targeted for monitoring, the status of each of these metrics, and the threshold that has been set.

FIG. 25 is an explanatory diagram showing methods for combining component monitoring control with metrics monitoring control. The table shown in FIG. 25 is used for explaining the monitoring control operations, but is not a table that is actually provided by the monitoring apparatus 10.

As described hereinabove, there are three types of component monitoring control methods, i.e. the monitoring mode, the non-monitoring mode, and the maintenance mode. The maintenance mode temporarily makes it appear that the component is normal, and since the operation of the maintenance mode is the same as the monitoring mode, the maintenance mode is included within the monitoring mode in FIG. 25.

In the metrics monitoring control method, as described using FIG. 17, it is possible to select whether or not a graph will be displayed (that is, whether or not performance information will be acquired) and whether or not an event notification will be issued. As a result of this, there are three methods for monitoring the metrics, i.e., (display graph, notify of event), (display graph, do not notify of event), and (do not display graph, do not notify of event). As mentioned hereinabove, the combination (do not display graph, notify of event) does not exist. This combination does not exist because it is not possible to acquire the performance information to determine whether or not an event has occurred.

In the case of the (display graph, notify of event), a graph is displayed, and, in addition, an event notification is issued in the monitoring mode and the maintenance mode. Actually, an event notification is not issued in the case of the maintenance mode, but when metrics monitoring transitions to the monitoring mode in accordance with the end of the maintenance work, a graph is displayed, and, in addition, an event notification is issued.

In the case of the (display graph, notify of event), a graph is displayed but an event notification is not issued in the non-monitoring mode. That is, a change in the metrics status is measured, but an alert is not outputted.

In the case of the (display graph, do not notify of event), a graph is displayed but an event notification is not issued in the monitoring mode and the maintenance mode.

Similarly, in the case of the (display graph, do not notify of event), a graph is displayed but an event notification is not issued in the non-monitoring mode.

In the case of the (do not display graph, do not notify of event), a graph is not displayed and an event notification is not issued in any of the monitoring mode, the maintenance mode or the non-monitoring mode.

Figure 26:
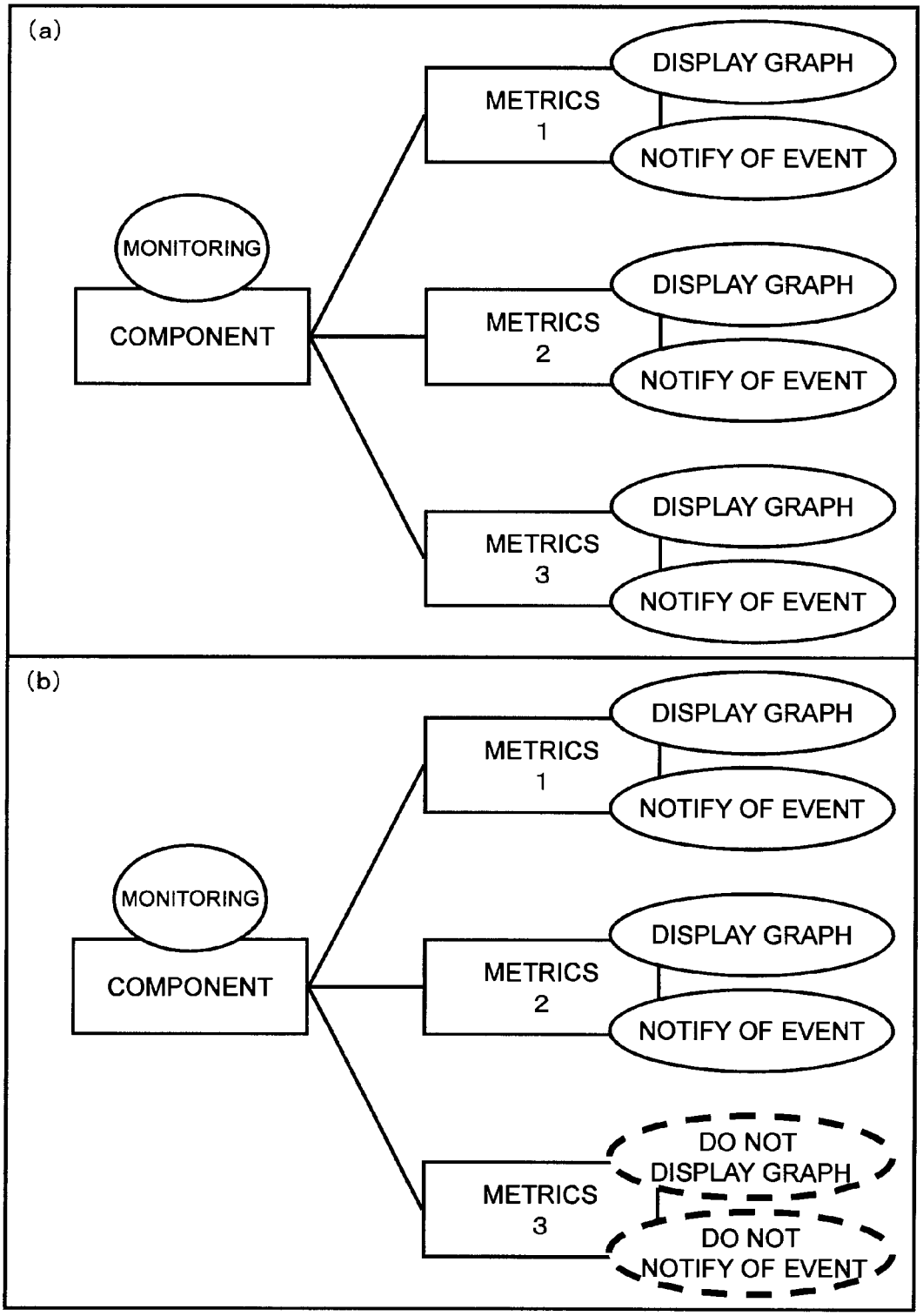
FIG. 26 is a diagram showing how a portion of the metrics of a plurality of metrics of a component is not monitored.

FIG. 26 shows the relationship between the monitoring method for the component as a whole and the plurality of metrics monitoring methods included for this component. As shown in FIG. 26(*a*), the monitoring method of a certain component is set to the monitoring mode. As shown in FIG. 25, in the case of the monitoring mode, a graph is displayed, and in addition, an event is notified. Therefore, the value of (display graph, notify of event) is set in accordance with the component monitoring method in the respective metrics included for this component.

As shown in FIG. 26(*b*), the user is able to make the monitoring method for a portion of the metrics differ from the monitoring method of the component. As described using FIG. 20, the user is able to change the desired monitoring method by simply attaching or removing a checkmark to or from the desired metrics graph display column GP40 or event notification column GP41 in the metrics list screen G40.

Configuring this example as described hereinabove achieves the following effect. Since a monitoring method is able to be set for each IT resource in this example, it is possible to set the monitoring method in accordance with the circumstances, thereby enhancing the usability of the user.

Figure 27:
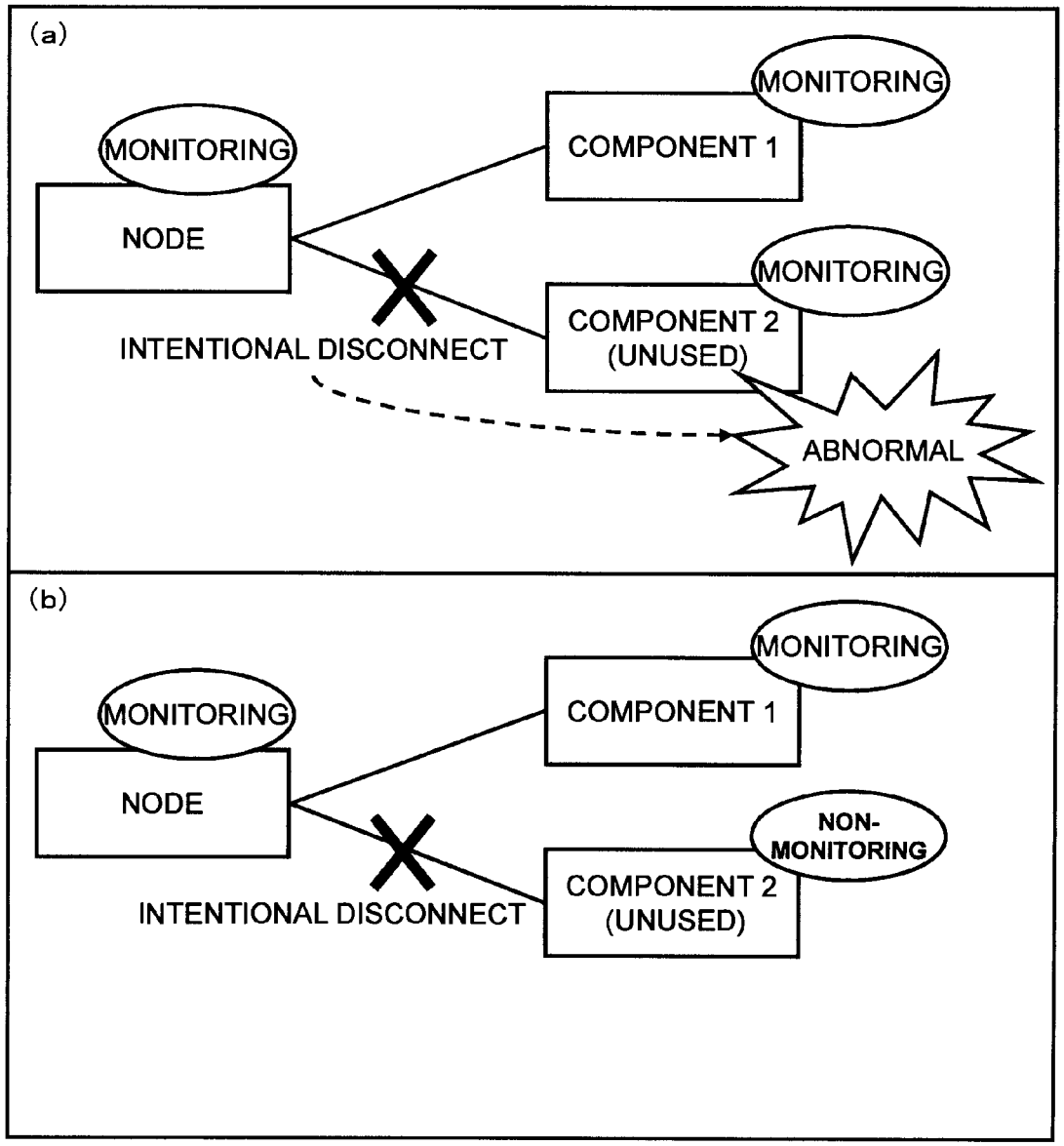
FIG. 27 is a diagram schematically showing how a user intentionally decouples a portion of the components from the node.

FIG. 27 shows how a failure is detected in an intended operation. FIG. 27 illustrates a case in which an unused component is removed from the node. As shown in FIG. 27(*a*), it is supposed that a certain node comprises a component 1 and a component 2, and that both components 1 and 2 are being monitored. Since the one component 2 is not being used, the user tries to intentionally disconnect this unused component 2. In a case where only one monitoring method is applicable for all of the node and the two components, the intentional disconnection of the component 2 will be detected as a failure.

Alternatively, as shown in FIG. 27(*b*), by changing the monitoring method of the component 2 that is scheduled to be disconnected to the non-monitoring mode beforehand, the user is able to suspend the monitoring for this component 2. Therefore, even a case in which the unused component 2 is disconnected from the node is not detected as a failure.

Figure 28:
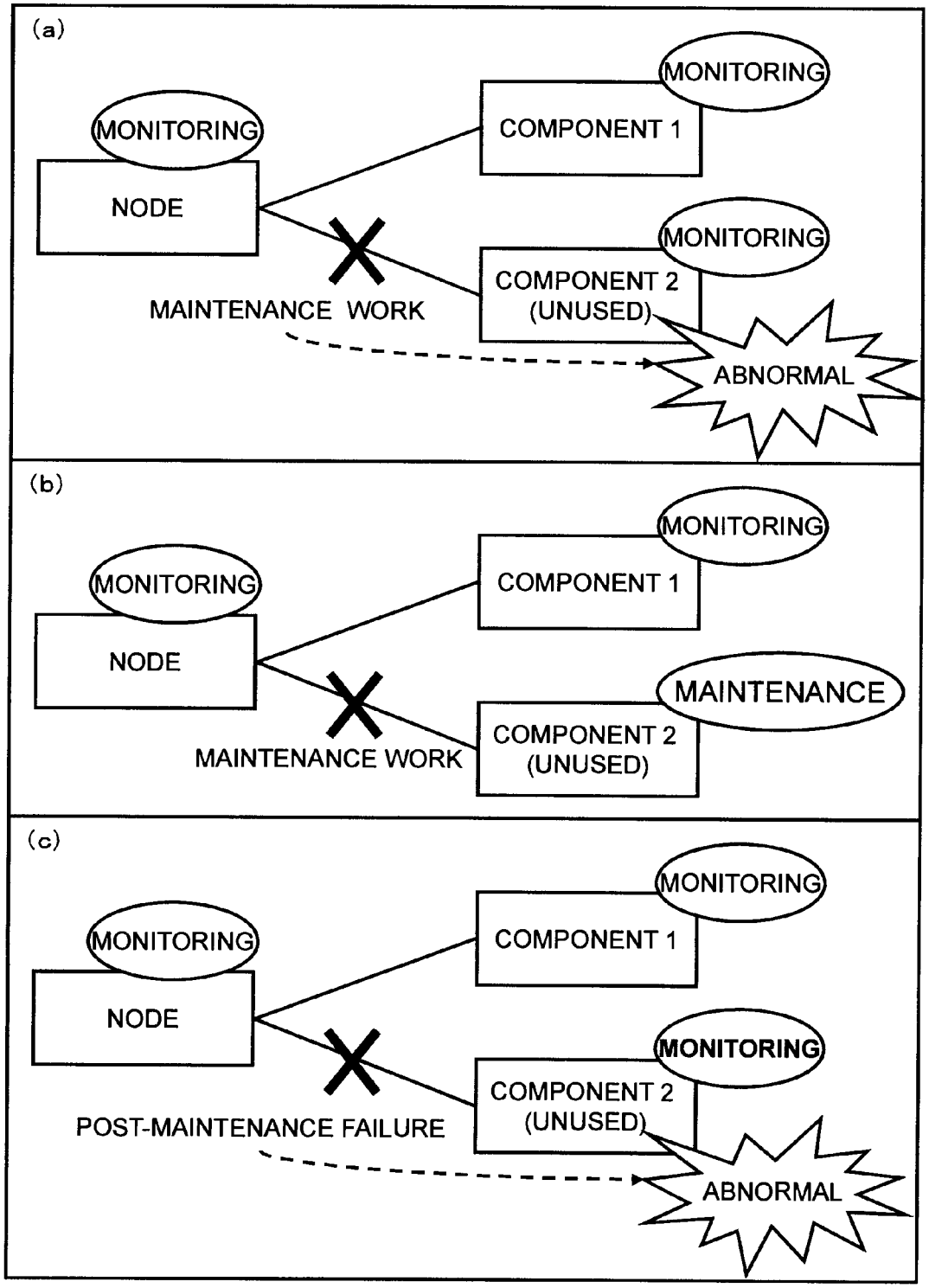
FIG. 28 is a diagram schematically showing how the user performs maintenance work.
Figure 29:
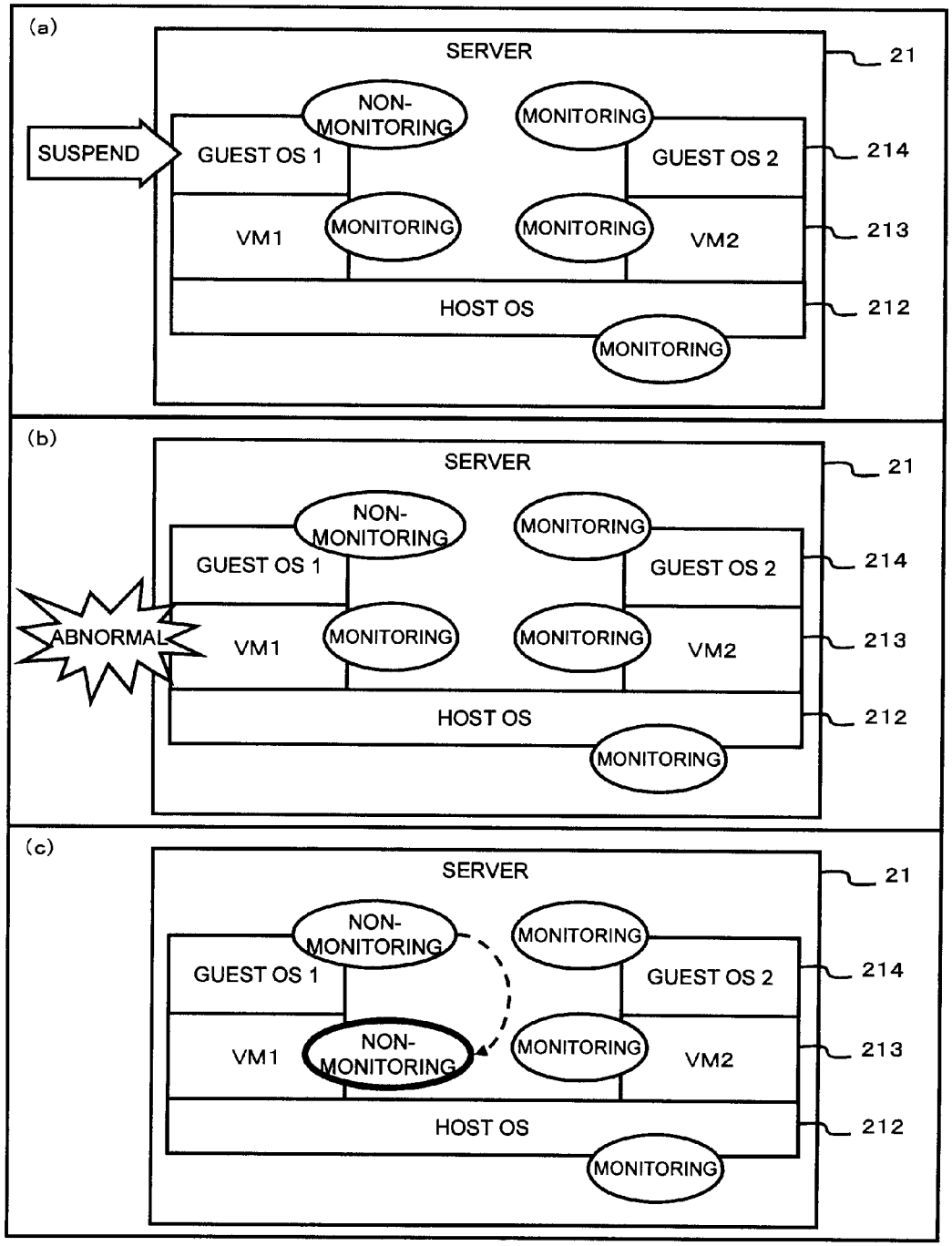
FIG. 29 is a diagram showing how the monitoring of a virtualization mechanism is suspended in conjunction with the suspension of the guest OS.

FIG. 28 shows a case of maintenance work. When the user carries out maintenance work for the component 2 in a case in which the node and two components 1 and 2 are being monitored as shown in FIG. 28(a), this maintenance work may be detected as a failure. For example, this may occur when the user removes the component 2 from the node, or when the user shuts off the power to the component 2.

As shown in FIG. 28(b), the user is able to change the monitoring mode of the maintenance-targeted component 2 to the maintenance mode prior to the start of maintenance work. In the case of the maintenance mode, the maintenance work will not be detected as a failure because the component 2 is forcibly made to appear to be normal. The status of the component 2 changes when the maintenance work is finished. Therefore, the monitoring method for the component 2 is automatically switched over from the maintenance mode to the monitoring mode.

As shown in FIG. 28(c), in a case where a failure occurs subsequent to the maintenance of component 2, this failure is detected and the user is notified.

In this example, it is possible to prevent the detection of a failure that the user is aware of in advance and to notify the user only of a real failure that the user is not aware of, thereby enhancing monitoring reliability and user convenience.

In addition, in this example, the configuration is such that a maintenance mode for use during maintenance work is provided, and the maintenance mode is automatically switched over to the monitoring mode subsequent to the completion of the maintenance work. Therefore, it is possible to prevent the outputting of unnecessary alerts during maintenance work, thereby making it possible to heighten the efficiency of maintenance work. Also, there is no need for the user to manually switch from the maintenance mode to the monitoring mode after maintenance work, thereby enhancing user convenience. Since a failure that occurs subsequent to maintenance work is able to be detected, the reliability of the monitoring apparatus is enhanced.

Example 2

A second example will be explained by referring to FIGS. 29 through 36. This example corresponds to a variation of the first example. Therefore, the focus will be on explaining the points that differ from the first example. In this example, in the case of IT resources that are associated with one another, when the monitoring method of the one IT resource is changed, the monitoring method of the other IT resource is changed by following suit this change. In this example, the inter-related IT resources will be explained by giving examples of a guest OS and virtualization mechanism combination, and a host OS and guest OS combination.

As shown in FIG. 29(a), the virtualization mechanism 213 is disposed as a component in the host OS 212, which is a node. The guest OS 214 is disposed as another node in the virtualization mechanism 213.

As shown in FIG. 29(b), in a case where the guest OS 214 is suspended after being set to the non-monitoring mode, the status of the virtualization mechanism 213 on which the guest OS 214 is disposed also changes. In a case where the virtualization mechanism 213 is set to the monitoring mode, a determination is made in accordance with the suspension of the guest OS 214 that a failure has occurred in the virtualization mechanism 213, which is the component of the host OS 212.

As shown in FIG. 29(c), in this example, in a case where the guest OS 214 has been switched over to the non-monitoring mode, the virtualization mechanism 213, which is associated with the guest OS 214, is also automatically switched over to the non-monitoring mode. In accordance with this, in a case where the guest OS 214 is suspended, in this example it is possible to prevent a failure from being detected for the virtualization mechanism 213.

Figure 30:
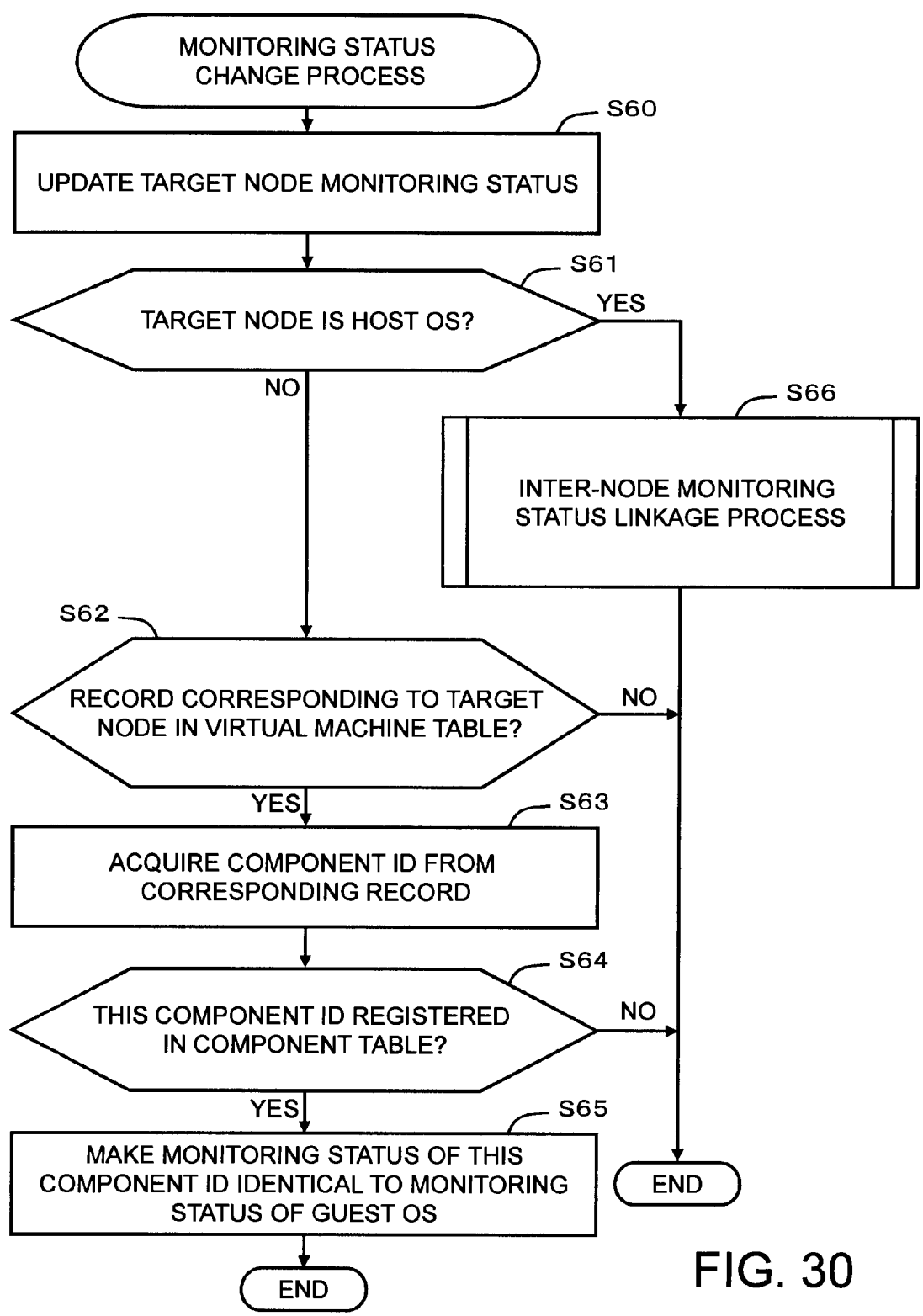
FIG. 30 is a flowchart of the processing for changing the monitoring status.

FIG. 30 is a flowchart of the processing for changing the monitoring mode (monitoring method). This process will be explained by giving an example of a case in which the monitoring mode of the component follow suit a change in the monitoring mode of the node.

When the user changes the monitoring mode of the node, the monitoring apparatus 10 updates the monitoring mode of the change-targeted node in the node table 151 (S60). The node for which the monitoring mode has been changed may be abbreviated as the target node hereinbelow. The target node corresponds to a "first monitoring-targeted object".

The monitoring apparatus 10 determines whether or not the target node is the host OS 212 (S61). In a case where the target node is not the host OS 212 (S61: NO), the monitoring apparatus 10 determines whether or not a record corresponding to the target node exists inside the virtual machine table 157 (S62). Since a case in which the guest OS 214 is the target node is being explained here, a determination of YES is made in S62.

The monitoring apparatus 10 acquires the component ID 1571 associated with the target node from the virtual machine table 157 (S62). The component (the guest OS here) associated with the target node corresponds to a "second monitoring-targeted object". The monitoring apparatus 10 determines whether or not the acquired component ID is registered in the component table 152 (S63).

In a case where the component ID acquired from the virtual machine table 157 is registered in the component table 152 (S63: YES), the monitoring apparatus 10 makes the monitoring status 1525 set in the component table 152 for this component ID 1520 identical to the monitoring status of the target node (the guest OS 214) that was changed in S60 (S65).

In a case where either a record corresponding to the target node does not exist in the virtual machine table 157 (S62: NO) or the component ID acquired from the virtual machine table 157 is not registered in the component table 152 (S64: NO), this processing ends.

In a case where the target node is the host OS 212 (S61: YES), the monitoring apparatus 10 moves to the "process for linking the monitoring status between nodes" (S66). The processing of S66 will be explained in detail below.

Figure 31:
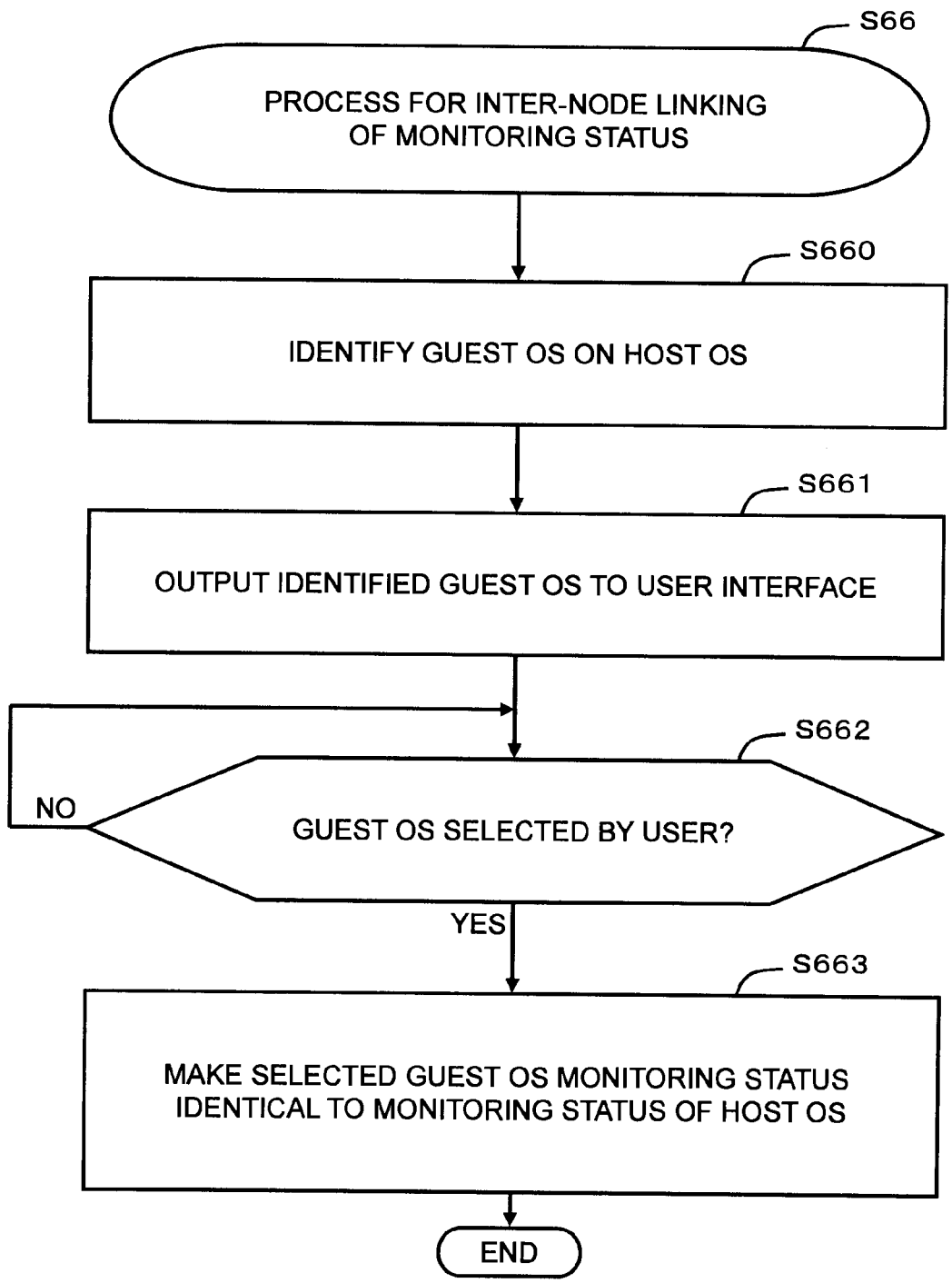
FIG. 31 is a flowchart showing the details of S66 in FIG. 30.

FIG. 31 is a flowchart showing the details of S66 in FIG. 30. In a case where the monitoring status of the host OS 212 is changed, the processing of FIG. 31 is carried out. The monitoring apparatus 10 references the node table 151 and identifies the guest OS 214 that is disposed on the host OS 212 for which the monitoring status is to be changed (S660).

The monitoring apparatus 10 outputs the identified guest OS 214 to the user interface part 110 as a "target-node-related node" (S661). The user selects, from among the guest OSs 214 being displayed in the user interface part 110, the guest OS 214 for which the change of the monitoring status of the host OS 212 will be followed.

When the guest OS 214 is selected by the user (S662: YES), the monitoring apparatus 10 makes the monitoring status of the selected guest OS 214 identical to that of the monitoring status of the host OS 212 (S663).

Figure 32:
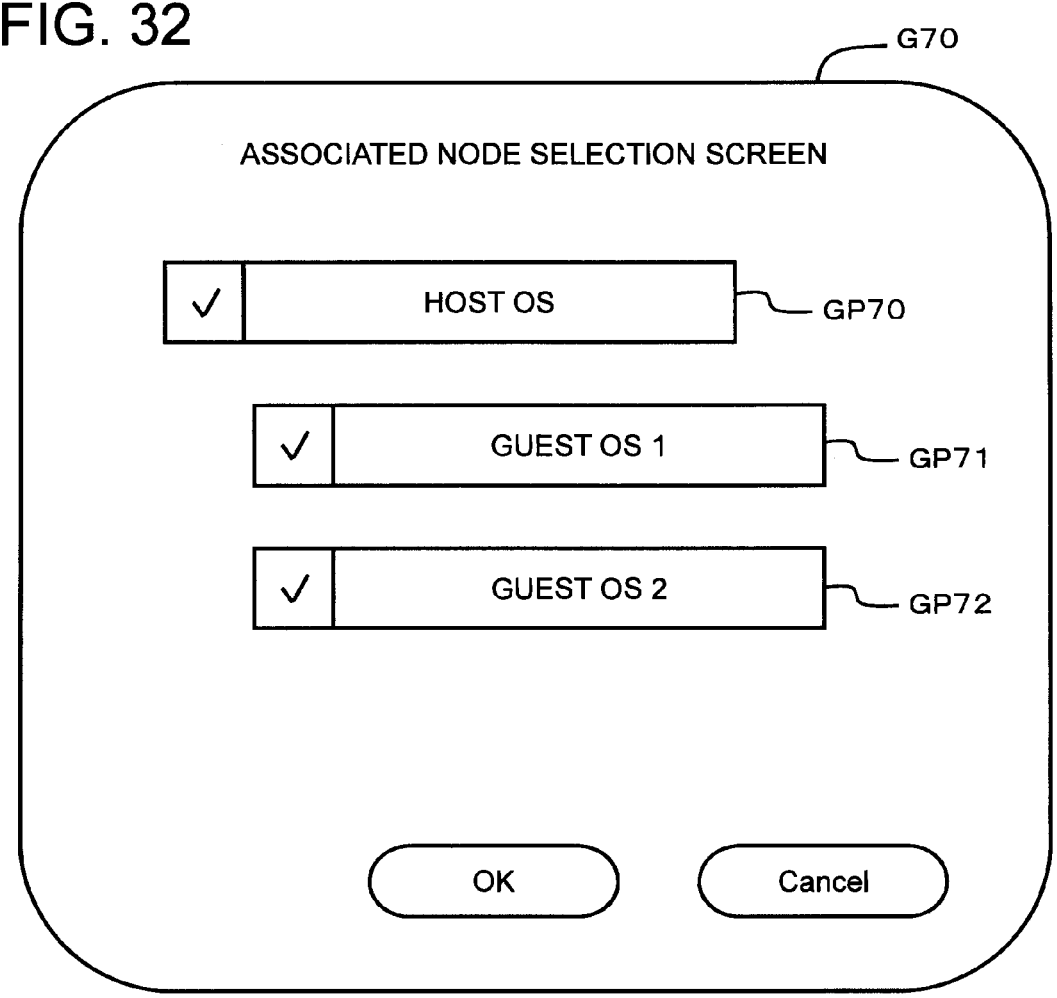
FIG. 32 is an example of a screen for selecting an associated node that changes the monitoring status.

FIG. 32 shows a screen G70 for selecting a node (an associated node hereinafter) that is associated with the target node. A target node field GP70 for displaying the change-targeted node is provided at the top of the screen G70.

Associated node display fields GP71 and GP72 for displaying the associated nodes, which are associated with the target node, are provided beneath the target node field GP70. The user is able to select the associated node that will follow suit the change of the target node monitoring status by selecting a desired associated node and entering a checkmark. When the user presses the OK button, the monitoring apparatus 10 makes the monitoring status of the selected associated node (the guest OS) identical to the monitoring status of the target node (the host OS) (S663).

Since configuring this example like this also makes it possible to individually set a monitoring mode for each IT resource, the same operational effects as the first example are achieved. In addition, in this example, in a case where the monitoring status of the one IT resource of the associated IT resources changes, the monitoring status of the other IT resource is made identical to the monitoring status of the one IT resource. Therefore, in this example, the output of unnecessary alerts can be reduced even further, thereby enhancing the usability of the user. User convenience is enhanced even more due to the fact that the user need not manually detect the associated IT resource or manually change the monitoring status thereof.

Furthermore, there are a plurality of methods for searching for an associated node. Accordingly, a variation of this example will be explained by referring to FIGS. 33 through 36.

Figure 33:
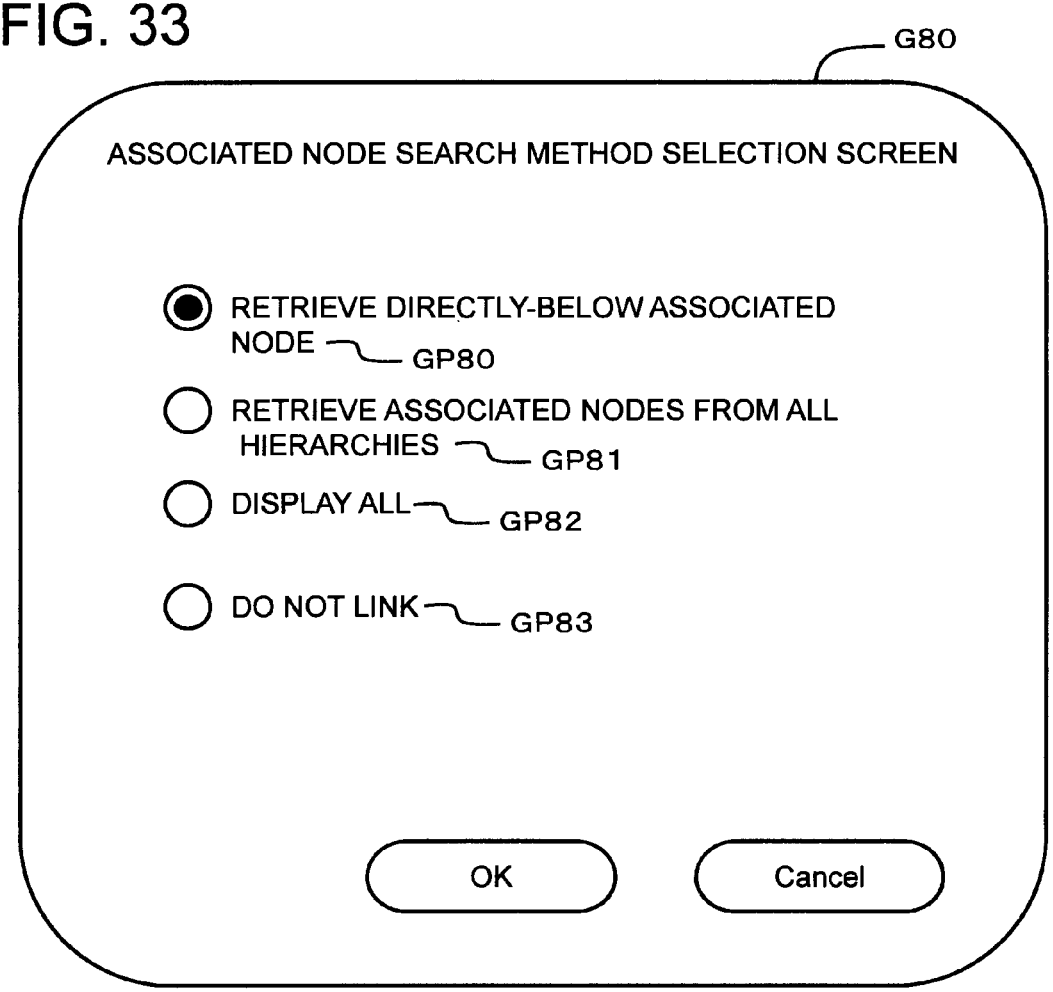
FIG. 33 is an example of a screen for selecting a monitoring status linkage method related to a second example.

FIG. 33 shows a screen G80 for selecting a method for searching for an associated node. A plurality of search methods GP80 through GP83 are displayed in the search method selection screen G80. The user selects any one search method and presses the OK button.

A first search method GP80 is for searching for another node that is located directly below the target node. The search method, for example, may also be called an extraction method since it extracts a candidate to which to link the monitoring status.

A second search method GP81 is for searching for another node that is not only located directly below the target node, but also located in all the hierarchies to which the target node is connected.

A third search method GP82 is for searching for all the other nodes inside the computer system.

A fourth search method GP83 is a method for linking the target node monitoring status to the monitoring status of another node. The third search method and the fourth search method are not actually methods for searching for an associated node, but for the sake of convenience are treated as types of methods for searching for an associated node.

Figure 34:
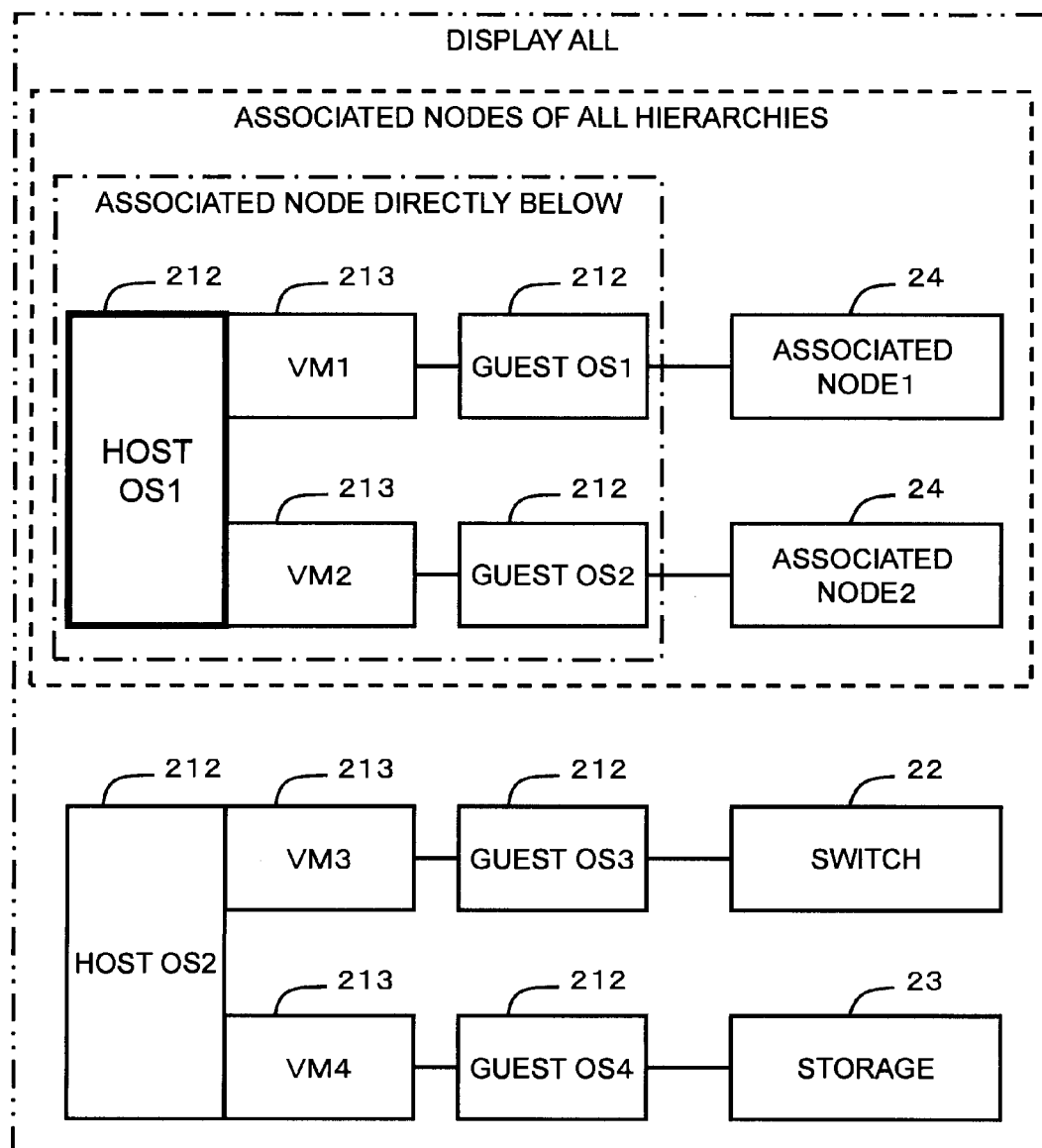
FIG. 34 is a schematic diagram showing the ranges within which nodes are extracted in accordance with the linkage methods.

FIG. 34 schematically shows the differences in the search ranges in accordance with the above-mentioned search methods. The target node is assumed to be the "host OS 1". In the first search method, the respective virtualization mechanisms VM1 and VM2, and the guest OS 1 and the guest OS 2, which are located directly below the host OS 1, are extracted. The user selects from among the VM1, the VM2, the guest OS 1 and the guest OS 2, and links the monitoring status to the host OS 1.

In the second search method, a node to which the directly-below associated node is associated is also extracted in addition to the node that is directly associated with the host OS 1. In the case of FIG. 34, one associated node 1, which is coupled to the one guest OS 1 and another associated node 2, which is coupled to the other guest OS 2, are extracted. A specific example of an associated node might be the switch 22 or the storage 23.

In the third search method, a search is carried out for all the nodes inside the computer system. In the example shown in the drawing, the other host OS 2, virtualization mechanisms VM 3 and VM 4, guest OS 3, guest OS 4, the switch 22 and the storage 23 are also extracted.

In the fourth search method, since a node to be linked with the change of the target node monitoring status is not set, no nodes are extracted.

Figure 35:
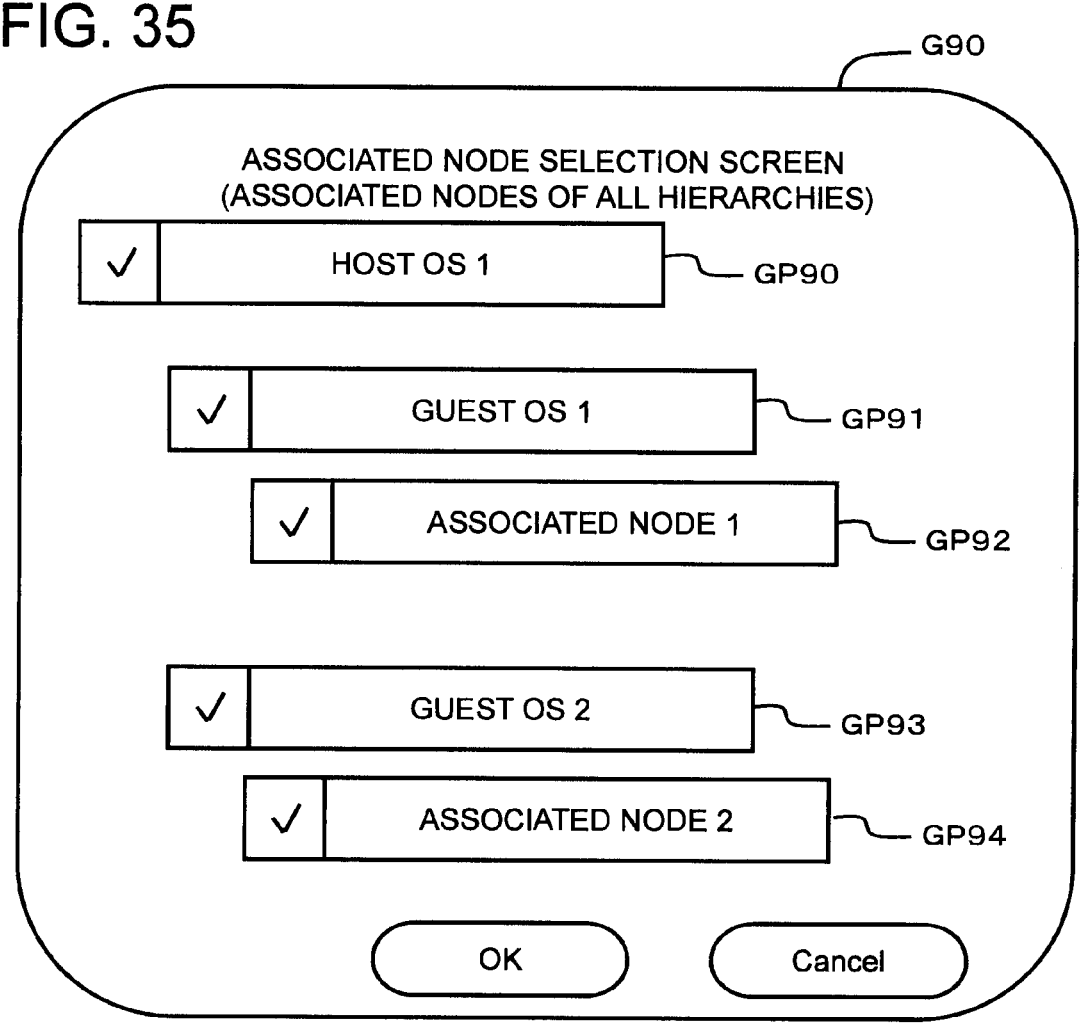
FIG. 35 is an example of the screen in a case where selection is carried out from among all hierarchies of associated nodes.

FIG. 35 shows a selection screen G90 in accordance with the second search method. The selection screen in accordance with the first search method is as shown in FIG. 32. In the selection screen G90 for realizing the second search method, associated node display fields GP91 and GP93 for displaying the associated nodes located directly below the target node are disposed beneath the target node field GP90 showing the target node.

In addition, other associated node display fields GP92 and GP94, which are for displaying other associated nodes that are associated with the associated node, are disposed beneath the associate node display fields GP91 and GP93.

Figure 36:
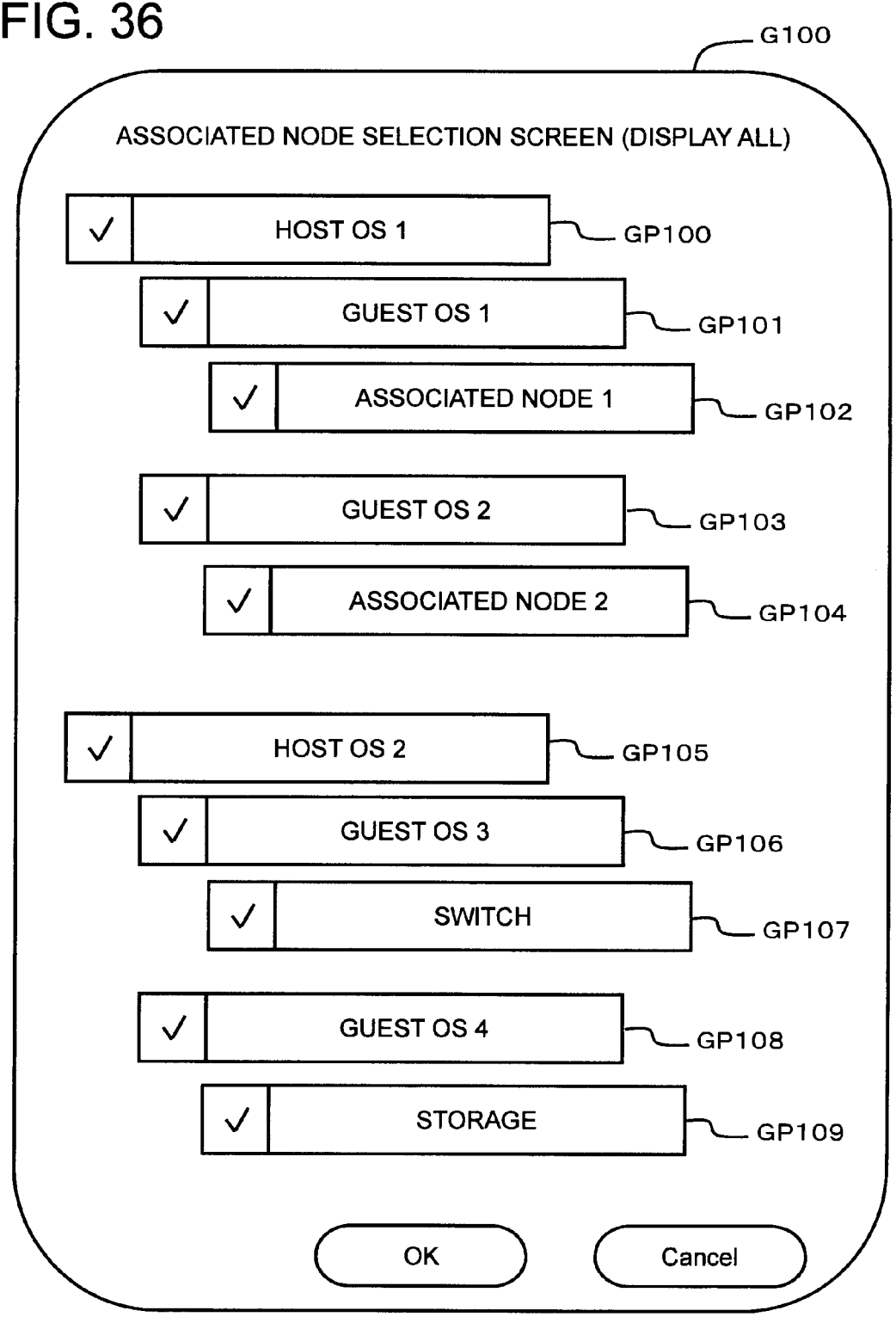
FIG. 36 is an example of the screen in a case where selection is carried out from among all the nodes inside the system.

FIG. 36 shows a selection screen G100 in accordance with the third search method. One group of nodes, which is associated with the target node, and another group of nodes, which is not associated with the target node in any way, are all displayed in this selection screen G100.

Focusing on the target node, a target node display field GP100, fields GP101 and GP103, which show associated nodes located directly below the target node, and fields GP102 and GP104, which show other associated nodes that are associated with these associated nodes, are disposed in the selection screen G100.

Focusing on other nodes that are not associated with the target node, other nodes GP105 through GP109 are also disposed in the selection screen G100. In the initial setting, checkmarks have been set for all the nodes displayed in the screen G100. The user, for example, is also able to remove node checkmarks that are considered unnecessary.

Example 3

Figure 37:
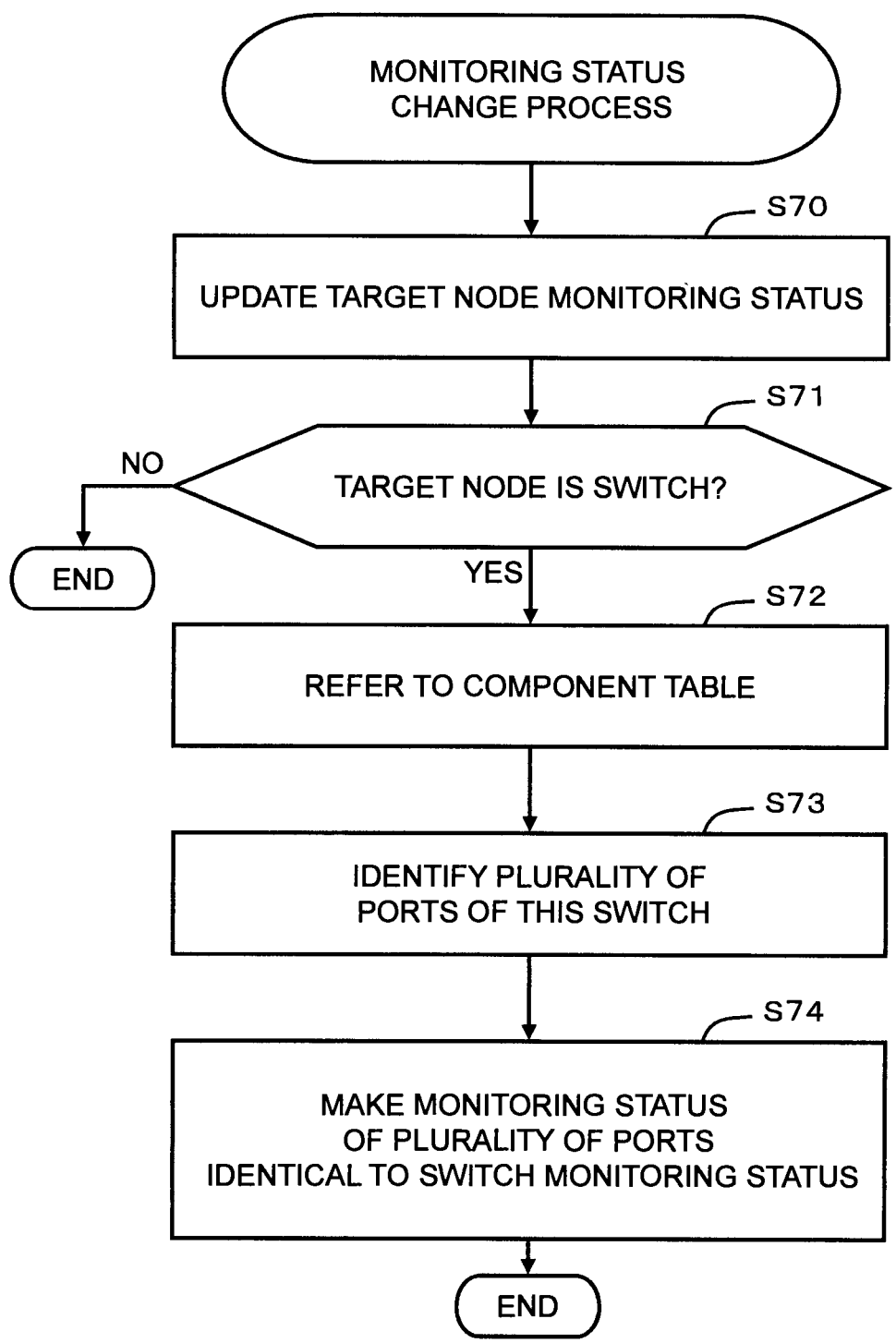
FIG. 37 is a flowchart of processing related to a third example for linking the monitoring status of the switch to the monitoring status of the switch port.

A third example will be explained by referring to FIGS. 37 and 38. In this example, a case in which the monitoring status is linked between a switch and a switch port will be explained. FIG. 37 is a flowchart showing the processing for changing the monitoring status. FIG. 38 shows how to change the monitoring status of the switch ports of this switch to the non-monitoring mode in a case where the monitoring status of the switch has changed to the non-monitoring mode.

The flowchart of FIG. 37 will be explained. When the user changes the monitoring status of the target node, the monitoring apparatus 10 updates the monitoring status 1514 of the target node registered in the node table 151 in accordance with the user operation (S70).

The monitoring apparatus 10 determines whether or not the type of node that is the target of the monitoring status change is a switch (S71). Since a case in which the target node is a switch will be explained here, the determination in S71 is YES.

The monitoring apparatus 10, as shown in FIG. 38, references the component table 152 (S72), and identifies all the switch ports comprising the switch (S73). The monitoring apparatus 10 makes the monitoring status of all the switch ports identified in S73 identical to the monitoring status of the switch (S74). Configuring this example like this also achieves the same operational effects as the above-mentioned second example.

Example 4

Figure 39:
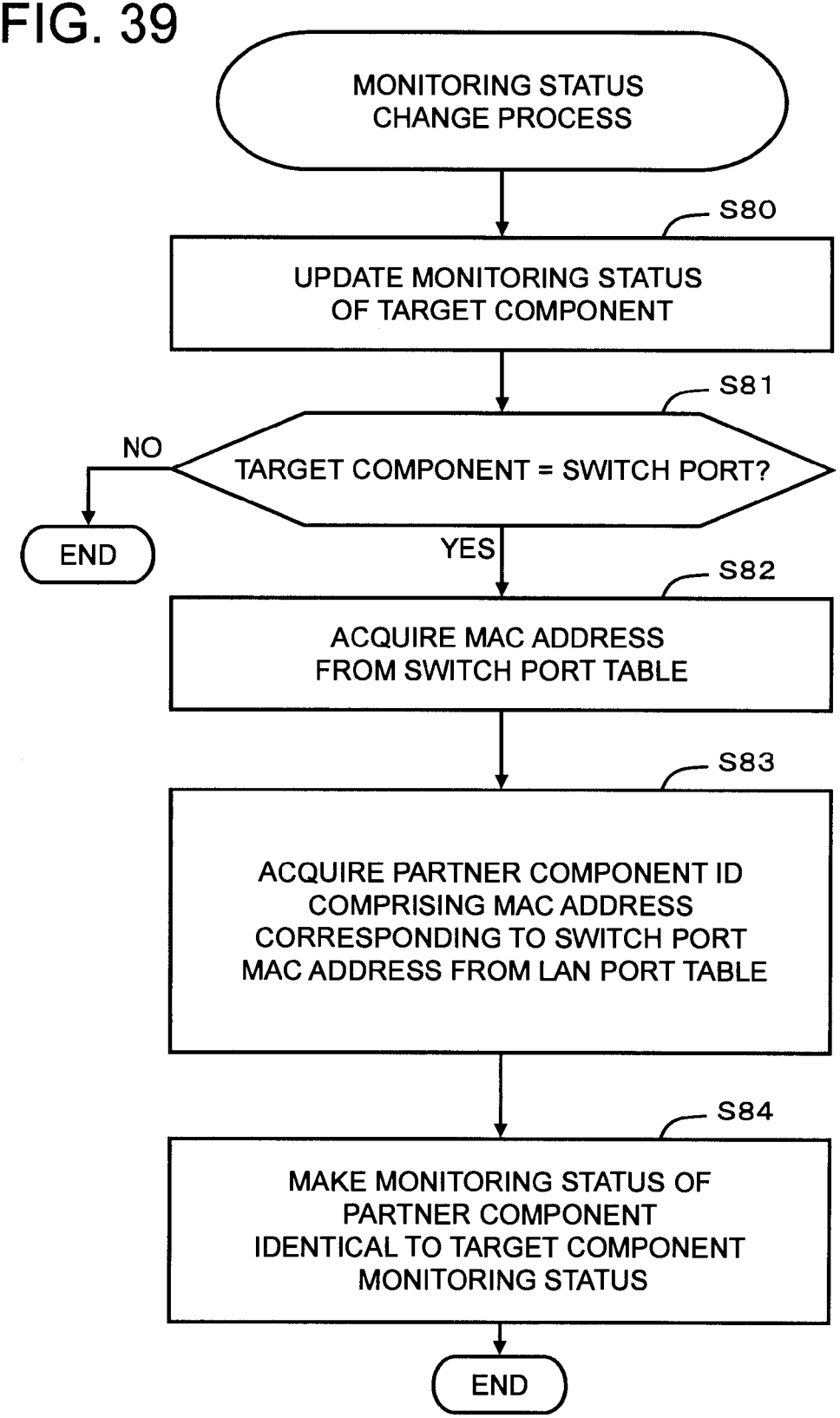
FIG. 39 is a flowchart showing the processing related to a fourth example for linking the monitoring status of one communication port to the monitoring status of another communication port that is coupled to the one communication port.
Figure 40:
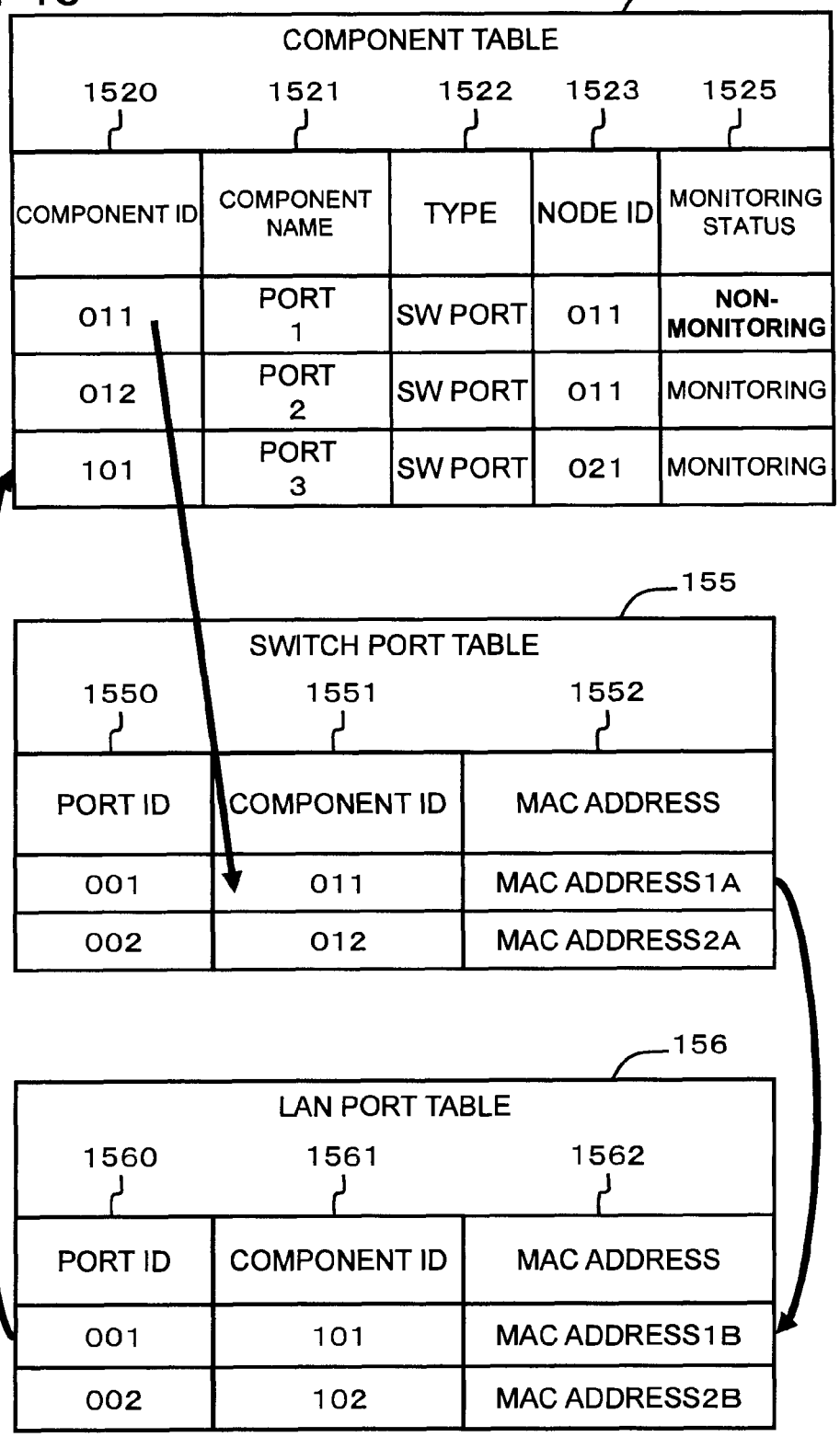
FIG. 40 is a diagram showing how the component table, the switch port table and the LAN port table are interlinked and updated.

A fourth example will be explained by referring to FIGS. 39 and 40. In this example, a case where the monitoring status is linked between communication ports that are coupled to one another will be explained. FIG. 39 shows a flowchart of processing for changing the monitoring status. FIG. 40 shows how, in a case where the monitoring status of the one communication port has been changed to the non-monitoring mode, the monitoring status of the other communication port, which is coupled to the one communication port, is changed to the non-monitoring mode.

The flowchart of FIG. 39 will be explained. When the user changes the monitoring status of the target component, the monitoring apparatus 10 changes the monitoring status 1525 of the target component to the non-monitoring mode in the component table 152 (S80).

The monitoring apparatus 10 determines whether or not the target component is a switch port (S81). Since a case in which the monitoring status is linked between a switch port and a LAN port is being explained here, the determination in S81 is YES.

The monitoring apparatus 10, as shown in FIG. 40, acquires the MAC address of the switch port, which is the target component, from the switch port table 155 (S82). The monitoring apparatus 10 references the LAN port table 156, and acquires the component ID of the LAN port that comprises the MAC address corresponding to the switch port MAC address (S83).

The monitoring apparatus 10 makes the monitoring status of the peer component (this is the LAN port here) identical to the monitoring status of the target component (this is the switch port here) (S84). Configuring this example like this achieves the same effects as the second example.

The present invention is not limited to the above-described embodiment. A person having ordinary skill in the art will be able to make various additions and changes without departing from the scope of the present invention. It is possible to change the monitoring status between the storage and a component that comprises the storage.

REFERENCE SIGNS LIST

1 Management system
2A Server
2B Switch
2C Storage
3 Microprocessor
3A Monitoring method setting part
3B Information acquiring part
3C Monitoring part
3D Monitoring method setting part
2A1, 2B1, 2B2, 2C1 Communication ports
2A2 Virtualization mechanism (VM)
2A3 Virtual machine
2C2 Microprocessor
2C3 Hard disk drive
4 Memory
5 Communication interface
6 User interface
10 Monitoring apparatus
21A, 21B Servers
22 Switch
23 Storage
110 User interface part
120 Database processing part
130 Control part
140 Information acquiring part
150 Database
210A, 210B Communication ports
211A, 211B Microprocessor
212, 212A Host OS
213, 213A Virtualization mechanism
214, 214A Guest OS
215B Hard disk drive
220 Switch port
230 Communication port
231 Microprocessor
232 Hard disk drive

The invention claimed is:

1. A method for controlling a management system that monitors a status of a computer system,
   wherein the computer system includes a plurality of monitoring-targeted nodes including components, which are monitoring targets, and at least one of the monitoring-targeted nodes is a first server computer which includes a plurality of virtual machines as components of the first server computer; and
   wherein a monitoring method for monitoring the monitoring-targeted nodes or components includes:
      a first mode, which outputs a prescribed notification in a case where a failure has been detected in at least one of the monitoring-targeted nodes or components,
      a second mode, which does not monitor the status of the at least one of the monitoring-targeted nodes or components, and
      a third mode, which determines that the current state of the at least one of the monitoring-targeted nodes or components is normal regardless of whether the status is normal or not, wherein the third mode transitions to the first mode in a case where the status of the at least one of the monitoring-targeted nodes or components has changed;
   the method comprising, by the management system:
      (1) managing the virtual machines as monitoring-targeted nodes in addition as components, by storing relations between the virtual machines and the first server computer;
      (2) configuring any one mode from among the plurality of modes of the monitoring method for each of the monitoring-targeted nodes corresponding to the virtual machines and each of the components corresponding to the virtual machines;
      (3) acquiring information from the first server computer and the virtual machines being monitoring-targeted nodes;
      (4) monitoring the virtual machines as the monitoring-targeted nodes and the virtual machines as the components of the first server computer, according to a mode of the monitoring method and the acquired information;
      (5) receiving a request for changing a mode of the monitoring method for one of the monitoring-targeted nodes corresponding to at least one of the virtual machines; and
      (6) changing a mode of the monitoring method for one of the components corresponding to the at least one of the virtual machines, by refering to the stored relations, in addition to changing the mode of the monitoring method for the one of the monitoring-targeted nodes corresponding to the at least one of the virtual machines, 2. A management system control method according to claim 1,
   wherein, for each of the components, the monitoring method comprises:

acquiring information related to a status of a prescribed attribute of a plurality of attributes of the component; and determining the status of the prescribed attribute by comparing the information related to the status of the prescribed attribute with a prescribed threshold.

3. A management system control method according to claim 1, wherein at least one attribute type is shared by two or more attributes of the components, and wherein the method by the management system further comprising:

receiving a request for attribute type configuration information for treating the two or more attributes by attribute type perspective;

receiving the attribute type configuration information; and controlling to display, notify, or monitor the two or more attributes of the components, based on the attribute type configuration information.

4. A management system control method according to claim 3, wherein the components having the two or more attributes are designated by a received request to enable the controlling based on the attribute type configuration information.

5. A management system control method according to claim 4, wherein the method by the management system further comprising:

displaying identifiers of the two or more attributes of components with attribute type and contents of the attribute type configuration information.

6. A non-transitory computer-readable medium storing a monitoring program for monitoring a status of a computer system by a management system, wherein the computer system includes a plurality of monitoring-targeted nodes including components, which are monitoring targets, and at least one of the monitoring-targeted nodes is a first server computer which includes a plurality of virtual machines as components of the first server computer, and wherein a monitoring method for monitoring the monitoring-targeted nodes or components includes:

a first mode, which outputs a prescribed notification in a case where a failure has been detected in at least one of the monitoring-targeted nodes or components, a second mode, which does not monitor the status of the at least one of the monitoring-targeted nodes or components, and a third mode, which determines that the current state of the at least one of the monitoring-targeted nodes or components is normal regardless of whether the status is normal or not, wherein the third mode transitions to the first mode in a case where the status of the at least one of the monitoring-targeted nodes or components has changed;

the monitoring program causing the management system to:

(1) manage the virtual machines as monitoring-targeted nodes in addition as components, by storing relations between the virtual machines mad the first server computer;

(2) configure any one mode from among the plurality of modes of the monitoring method for each of the monitoring-targeted nodes corresponding to the virtual machines and each of the components corresponding to the virtual machines;

(3) acquire information from the first server computer and the virtual machines being monitoring-targeted nodes;

(4) monitor the virtual machines as the monitoring-targeted nodes and the virtual machines as the components of the first server computer, according to a mode of the monitoring method and the acquired information;

(5) receive a request for changing a mode of the monitoring method tier one of the monitoring-targeted nodes corresponding to at least one of the virtual machines; and (6) change a mode of the monitoring method for one of the components corresponding to the at least one of the virtual machines, by referring to the stored relations, in addition to changing the mode of the monitoring method for the one of the monitoring- targeted nodes corresponding to the at least one of the virtual machines.

7. A non-transitory computer-readable medium according to claim 6, wherein, for each of the components, the monitoring program further causing the management system to:

determine whether or not to acquire information related to a status of a prescribed attribute of a plurality of attributes of the component; and determine whether or not to obtain the status of the prescribed attribute by comparing the information related to the status of the prescribed attribute with a prescribed threshold.

8. A non-transitory computer-readable storago medium according to claim 6, wherein at least one attribute type are shared by two or more attributes of the components, and wherein the monitoring program further causing the management system to:

receive a request for attribute type configuration information for treating the two or more attributes by the attribute type perspective;

receiving the attribute type configuration information; and control to display, notify, or monitor the two or more attributes of the components, based on the attribute type configuration information.

9. A non-transitory computer-readable storago medium according to claim 8, wherein the components having the two or more attributes are designated by a received request to enable the controlling based on the attribute type configuration information.

10. A non-transitory computer-readable storago medium according to claim 9, wherein the monitoring program further causing the management system to:

display identifiers of the two or more attributes of components with attribute type and contents of the attribute type configuration information.

11. A system comprising:

(A) a plurality of monitoring-targeted nodes including components, which are monitoring targets, wherein at least one of the monitoring-targeted nodes is a first server computer which includes a plurality of virtual machines as components of the first server computer, wherein a monitoring method for monitoring the monitoring-targeted nodes or components includes:

a first mode, which outputs a prescribed notification in a case where a failure has been detected in at least one of the monitoring-targeted nodes or components, a second mode, which does not monitor the status of the at least one of the monitoring-targeted nodes or components, and a third mode, which determines that the current state of the at least one of the monitoring-targeted nodes or components is normal regardless of whether the status is normal or not, wherein the third mode transitions to the first mode in a case where the status of the at least one of the monitoring-targeted nodes or components has changed; and (B) a management system configured to:
(1) manage the virtual machines as monitoring-targeted nodes in addition as components, by storing relations between the virtual machines and the first server computer;
(2) configure any one mode from among the plurality of modes of the monitoring method for each of the monitoring-targeted nodes corresponding to the virtual machines and each of the components corresponding to the virtual machines;
(3) acquire information from the first server computer and the virtual machines being monitoring-targeted nodes;
(4) monitor the virtual machines as the monitoring-targeted nodes and the virtual machines as the components of the first server computer, according to a mode of the monitoring method and the acquired information;
(5) receive a request for changing a mode of the monitoring method for one of the monitoring-targeted nodes corresponding to at least one of the virtual machines; and
(6) change a mode of the monitoring method for one of the components corresponding to the at least one of the virtual machines, by refering to the stored relations, in addition to changing the mode of the monitoring method for the one of the monitoring-targeted nodes corresponding to the at least one of the virtual machines.

12. A system according to claim 11,
wherein the management system further configured to:
determine whether or not to acquire information related to a status of a prescribed attribute of a plurality of attributes of the component; and
determine whether or not to obtain the status of the prescribed attribute by comparing the information related to the status of the prescribed attribute with a prescribed threshold.

13. A system according to claim 11,
wherein at least one attribute type are shared by two or more attributes of the components, and
wherein the management system is further configured to:
receive a request for attribute type configuration information for treating the two or more attributes by attribute type perspective; and
control to display, notify, or monitor the two or more attributes of the components, based on the attribute type configuration information.

14. A system according to claim 13,
wherein the components having the two or more attributes are designated by a received request to enable the controlling based on the attribute type configuration information.

15. A system according to claim 14,
wherein the management system is further configured to:
display identifiers of the two or more attributes of components with attribute type and contents of the attribute type configuration information.

\* \* \* \* \*